(12) United States Patent
Hirata et al.

(10) Patent No.: US 8,885,131 B2
(45) Date of Patent: Nov. 11, 2014

(54) LIQUID CRYSTAL DISPLAY DEVICE

(75) Inventors: Mitsuaki Hirata, Osaka (JP); Masae Kitayama, Osaka (JP); Kenichi Hyohdoh, Osaka (JP); Ikumi Itsumi, Osaka (JP); Yuki Yamashita, Osaka (JP); Akane Sugisaka, Osaka (JP); Fumikazu Shimoshikiryoh, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 252 days.

(21) Appl. No.: 13/575,696

(22) PCT Filed: Jan. 27, 2011

(86) PCT No.: PCT/JP2011/051622
§ 371 (c)(1),
(2), (4) Date: Aug. 29, 2012

(87) PCT Pub. No.: WO2011/093387
PCT Pub. Date: Aug. 4, 2011

(65) Prior Publication Data
US 2013/0002992 A1 Jan. 3, 2013

(30) Foreign Application Priority Data
Jan. 29, 2010 (JP) .................................. 2010-019259

(51) Int. Cl.
*G02F 1/1343* (2006.01)
*G09G 3/20* (2006.01)
*G02F 1/1362* (2006.01)
*G09G 3/36* (2006.01)

(52) U.S. Cl.
CPC .............. *G09G 3/207* (2013.01); *G02F 1/1362* (2013.01); *G09G 3/2074* (2013.01); *G09G 3/2077* (2013.01); *G09G 3/3648* (2013.01); *G09G 3/3655* (2013.01); *G02F 2201/52* (2013.01); *G09G 2300/0443* (2013.01); *G09G 2300/0452* (2013.01); *G09G 2300/0876* (2013.01); *G09G 2310/0262* (2013.01); *G09G 2320/0673* (2013.01); *G09G 2320/068* (2013.01); *G09G 3/3614* (2013.01); *G09G 2300/0447* (2013.01)
USPC .......................................... 349/144; 349/109

(58) Field of Classification Search
CPC .................... G02F 1/1362; G09G 2300/0447; G09G 3/207; G09G 3/2074; G09G 3/2077; G09G 3/3648; G09G 2300/0443; G09G 2300/0452; G09G 2300/0876; G09G 2310/0262; G09G 2320/0673; G09G 2320/068; G09G 3/3614; G09G 3/3655
USPC ................... 349/85, 106, 108, 109, 143, 144; 345/88, 89
See application file for complete search history.

(56) References Cited

U.S. PATENT DOCUMENTS 4,800,375 A 1/1989 Silverstein et al.
6,952,252 B2 10/2005 Nakanishi
(Continued)

FOREIGN PATENT DOCUMENTS

JP 09-251160 A 9/1997
JP 2001-209047 A 8/2001
(Continued)

OTHER PUBLICATIONS

Official Communication issued in International Patent Application No. PCT/JP2011/051622, mailed on Apr. 12, 2011.
(Continued)

*Primary Examiner* — Dung Nguyen
*Assistant Examiner* — Tai Duong
(74) *Attorney, Agent, or Firm* — Keating & Bennett, LLP

(57) ABSTRACT

A liquid crystal display device (100) according to the present invention includes a color display pixel D including pixels PA through PD arrayed in a matrix. The pixels PA through PD respectively include sub pixels SA1 through SD1 and sub pixels SA2 through SD2. At least at an intermediate gray scale level, the luminance of the sub pixels SA2 through SD2 is higher than the luminance of the sub pixels SA1 through SD1. The plurality of sub pixels S included in the pixels PA through PD are arrayed in a matrix. The sub pixel SA2 is adjacent to the sub pixel SB2 in the row direction, is adjacent to the sub pixel SC2 in the column direction, and is adjacent to the sub pixel SD2 in an oblique direction.

6 Claims, 15 Drawing Sheets

(56) References Cited

U.S. PATENT DOCUMENTS

| | | | |
|---|---|---|---|
| 6,958,791 | B2 | 10/2005 | Shimoshikiryo |
| 6,977,704 | B2 | 12/2005 | Kataoka |
| 7,864,271 | B2 * | 1/2011 | Nakamura et al. ............ 349/109 |
| 8,184,223 | B2 | 5/2012 | Tsubata |
| 2004/0174389 | A1 | 9/2004 | Ben-David et al. |
| 2005/0122294 | A1 | 6/2005 | Ben-David et al. |
| 2006/0055858 | A1 | 3/2006 | Nakanishi et al. |
| 2009/0115952 | A1 | 5/2009 | Nakamura et al. |
| 2010/0277677 | A1 | 11/2010 | Nakamura et al. |

FOREIGN PATENT DOCUMENTS

| | | |
|---|---|---|
| JP | 2001-306023 A | 11/2001 |
| JP | 2002-357830 A | 12/2002 |
| JP | 2003-177418 A | 6/2003 |
| JP | 2004-062146 A | 2/2004 |
| JP | 2006-78968 A | 3/2006 |
| WO | 2007/148519 A1 | 12/2007 |
| WO | 2009/130826 A1 | 10/2009 |

OTHER PUBLICATIONS

Yang et al.; "31.1: Development of Six Primary-Color LCD"; Society for Information Display, 2005 International Symposium Digest of Technical Papers; vol. XXXVI, Book II; May 25-27, 2005; pp. 1210-1213.

Chino et al.; "25.1: Invited Paper: Development of Wide-Color-Gamut Mobile Displays With Four-Primary-Color LCDs"; Society for Information Display, 2006 International Symposium Digest of Technical Papers; vol. XXXVII, Book II; Jun. 7-9, 2006; pp. 1221-1224.

Ben-Chorin; "Improving LCD TV Color Using Multi-Primary Technology"; FPD International 2005 Forum; Oct. 19, 2005; Total of 66 pages.

Hanaoka et al.; "40.1: A New MVA-LCD by Polymer Sustained Alignment Technology"; SID 04 Digest; 2004; pp. 1200-1203.

English translation of Official Communication issued in corresponding International Application PCT/JP2011/051622, mailed on Sep. 27, 2012.

* cited by examiner

LIQUID CRYSTAL DISPLAY DEVICE

TECHNICAL FIELD

The present invention relates to a liquid crystal display device, and more specifically to a liquid crystal display device including a color display pixel, which includes a plurality of pixels arrayed in a matrix.

BACKGROUND ART

A liquid crystal display device is a planar display device having superb characteristics including high definition, thinness, lightweight, low power consumption and the like. Recently, the market size of liquid crystal display devices has been rapidly increased owing to improvement thereof in display performance, production capability and price competitiveness against other display devices. In a twisted nematic mode (TN mode) liquid crystal display device which is conventionally common, alignment treatment is performed such that the longer axis of liquid crystal molecules having positive dielectric anisotropy is generally parallel to surfaces of substrates and is twisted by about 90° between the upper and lower substrates along a thickness direction of the liquid crystal layer. When a voltage is applied to the liquid crystal layer, the liquid crystal molecules rise to be parallel to the electric field and thus the twist alignment disappears. In such a TN mode liquid crystal display device, a change of optical rotatory power which is caused by a change of alignment of the liquid crystal molecules by voltage application is utilized to control the amount of light to be transmitted.

Such a TN mode liquid crystal display device provides a large production margin and thus has superb productivity, but has a problem in terms of display performance, especially in the viewing angle characteristic. Specifically, when being observed in an oblique direction, the display plane of the TN mode liquid crystal display device exhibits a significantly decreased contrast ratio; more specifically, in the case where an image, which clearly exhibits a plurality of gray scale levels from black to white when being observed in a frontal direction, is observed in an oblique direction, the luminance difference between the gray scale levels is made significantly unclear. There is another problem that the gray scale characteristic of display is inverted; specifically, a darker area when being observed in a frontal direction appears to be brighter when being observed in an oblique direction (so-called gray scale inversion phenomenon).

Recently, as display devices having a more improved viewing angle characteristic than that of TN mode liquid crystal display devices, liquid crystal display devices of an in-plane switching mode (IPS mode), a multi-domain vertical alignment mode (MVA) mode, axially symmetric aligned microcell mode (ASM) mode, and the like have been developed. Liquid crystal display devices of these novel modes (wide viewing angle modes) solve the specific problems described above regarding the viewing angle characteristic, namely, the problems of the significant decrease of the display contrast ratio and the display gray scale inversion which are caused when the display plane is observed in an oblique direction.

However, as the display quality of the liquid crystal display devices is improved, a new problem of the viewing angle characteristic that the γ characteristic by observation in a frontal direction is different from the γ characteristic by observation in an oblique direction, namely, viewing angle dependence of the γ characteristic has become conspicuous today. The term "γ characteristic" means gray scale dependence of the display luminance. The γ characteristic in a frontal direction being different from the γ characteristic in an oblique direction means that the gray scale display state is different depending on the direction of observation. This problem is serious especially for displaying an image such as a photograph or the like or displaying TV broadcasting or the like.

According to a known method for alleviating the viewing angle dependence of the γ characteristic, two or more sub pixels are provided in one pixel, and the luminance of one sub pixel is made different from the luminance of the other sub pixel in display at an intermediate gray scale level (see, for example, Patent Document 1).

FIG. 18 is a schematic view of a liquid crystal display device 800 disclosed in Patent Document 1. In the liquid crystal display device 800, sub pixel electrodes 824s1 and 824s2 are connected to a common source line Ls via corresponding TFTs 830s1 and 830s2, and thus form capacitance coupling with corresponding storage capacitor lines CSa and CSb. In the liquid crystal display device 800, the storage capacitor lines CSa and CSb have different voltages from each other, and thus potentials of the sub pixel electrodes 824s1 and 824s2 are different from each other. As a result, the luminances of corresponding sub pixels S1 and S2 are different from each other. In this manner, the viewing angle characteristic is improved.

FIG. 19 is a schematic view of another liquid crystal display device 900 disclosed in Patent Document 1. In the liquid crystal display device 900, sub pixel electrodes 924s1 and 924s2 are connected to different source lines Lsa and Lsb via different TFTs 930s1 and 930s2. In the liquid crystal display device 900 also, potentials of the sub pixel electrodes 924s1 and 924s2 are different from each other, and thus the luminances of corresponding sub pixels S1 and S2 are different from each other. In this manner, the viewing angle characteristic is improved.

In a conventionally general liquid crystal display device, one color display pixel includes three pixels for displaying red, green and blue, which are the three primary colors of light. Recently, a display device including a color display pixel which includes four or more pixels for displaying different colors has been proposed. Such a display device is referred to as a "multiple primary color display device". In a multiple primary color display device, the three colors of red, green and blue and also another color are used, and thus display can be provided in a wide color reproduction range (see, for example, Patent Document 2).

Patent Document 2 discloses a liquid crystal display device including a color display pixel which includes red, green, blue and yellow pixels. In the liquid crystal display device in Patent Document 2, the red, green, blue and yellow pixels are arrayed in two rows by two columns. The pixels are designed such that the red pixel and the blue pixel each have an area size larger than the size area of each of the green pixel and the yellow pixel.

CITATION LIST

Patent Literature

Patent Document 1: Japanese Laid-Open Patent Publication No. 2004-62146
Patent Document 2: International Publication No. 2007/148519

SUMMARY OF INVENTION

Technical Problem

The present inventors found that when a mere color display pixel in which a plurality of pixels, each including a plurality of sub pixels, are arrayed in a matrix is produced, specifically, a border area between areas of different gray scale levels may appear to be colored, which declines the display quality.

The present invention made in light of the above-described problem has an object of suppressing the reduction of the display quality in a liquid crystal display device including a color display pixel in which a plurality of pixels, each including a plurality of sub pixels, are arrayed in a matrix.

Solution to Problem

A liquid crystal display device according to the present invention includes a color display pixel which includes a plurality of pixels arrayed in a matrix of a plurality of rows by a plurality of columns. The plurality of pixels include a first pixel; a second pixel adjacent to the first pixel in a row direction; a third pixel adjacent to the first pixel in a column direction; and a fourth pixel adjacent to the second pixel in the column direction and adjacent to the third pixel in the row direction. The plurality of pixels each include a plurality of sub pixels including a first sub pixel and a second sub pixel; at least at an intermediate gray scale level, in each of the plurality of pixels, the second sub pixel exhibits a luminance higher than the luminance of the first sub pixel; the plurality of sub pixels included in the plurality pixels are arrayed in a matrix of a plurality of rows by a plurality of columns; and the second sub pixel in the first pixel is adjacent to the second sub pixel in the second pixel in the row direction, is adjacent to the second sub pixel in the third pixel in the column direction, and is adjacent to the second sub pixel in the fourth pixel in an oblique direction.

In an embodiment, the first sub pixel in the first pixel and the first sub pixel in the second pixel are adjacent to each other in the row direction; and the first sub pixel in the third pixel and the first sub pixel in the fourth pixel are adjacent to each other in the row direction.

In an embodiment, the plurality of pixels further include a fifth pixel adjacent to the second pixel in the row direction; and a sixth pixel adjacent to the fourth pixel in the row direction.

In an embodiment, the first sub pixel in the first pixel and the first sub pixel in the third pixel are adjacent to each other in the column direction; and the first sub pixel in the second pixel and the first sub pixel in the fourth pixel are adjacent to each other in the column direction.

In an embodiment, the plurality of pixels further include a fifth pixel adjacent to the third pixel in the column direction; and a sixth pixel adjacent to the fourth pixel in the column direction.

In an embodiment, the plurality of pixels display different colors from each other.

In an embodiment, the plurality of pixels include a red pixel, a green pixel, a blue pixel and a yellow pixel as the first, second, third and fourth pixels.

In an embodiment, the red pixel and the blue pixel each have an area size larger than the area size of each of the green pixel and the yellow pixel.

In an embodiment, in each of the plurality of pixels, the first sub pixel has an area size larger than the area size of the second sub pixel.

Advantageous Effects of Invention

According to the present invention, in a liquid crystal display device including a color display pixel in which a plurality of pixels, each including a plurality of sub pixels, are arrayed in a matrix, the reduction of the display quality can be suppressed.

BRIEF DESCRIPTION OF DRAWINGS

FIG. 1(a) is a schematic view of a liquid crystal display device in an embodiment according to the present invention, and FIG. 1(b) is a schematic view of one color display pixel and the vicinity thereof in the liquid crystal display device.

FIG. 2 is a schematic view of one color display pixel in the liquid crystal display device shown in FIG. 1.

FIG. 3 is a schematic view of one color display pixel in a liquid crystal display device as a comparative example.

FIG. 4(a) is a schematic view of a display plane of the liquid crystal display device as the comparative example, and FIG. 4(b) is a schematic view of a display plane of the liquid crystal display device shown in FIG. 2.

FIG. 5 is a schematic view of the liquid crystal display device shown in FIG. 1.

FIG. 6 is a schematic view of an example of sub pixel electrode in the liquid crystal display device shown in FIG. 1.

FIG. 7 is a schematic view of a liquid crystal display device in another embodiment according to the present invention.

FIG. 8 is an equivalent circuit diagram of the liquid crystal display device shown in FIG. 7.

FIG. 9 shows the waveforms of gate signals and the polarities of the color display pixels in the liquid crystal display device shown in FIG. 7.

FIG. 10 shows the waveforms of source and gate signals in the liquid crystal display device shown in FIG. 7.

FIG. 11 is a schematic view of a liquid crystal display device in still another embodiment according to the present invention.

FIG. 12 is a schematic view of a liquid crystal display device in still another embodiment according to the present invention.

FIG. 13 is a schematic view of a liquid crystal display device in still another embodiment according to the present invention.

FIG. 14 is a schematic view of a liquid crystal display device in still another embodiment according to the present invention.

FIG. 15 is a schematic view of a liquid crystal display device in still another embodiment according to the present invention.

FIG. 16 is a schematic view of a liquid crystal display device in still another embodiment according to the present invention.

FIG. 17 is a schematic view of a liquid crystal display device in still another embodiment according to the present invention.

FIG. 18 is a schematic view of a conventional liquid crystal display device.

FIG. 19 is a schematic view of another conventional liquid crystal display device.

FIG. 20 is a schematic view of a liquid crystal display device in still another embodiment according to the present invention.

DESCRIPTION OF EMBODIMENTS

Hereinafter, liquid crystal display devices in embodiments according to the present invention will be described with reference to the drawings. The present invention is not limited to the following embodiments.

Figure 1:
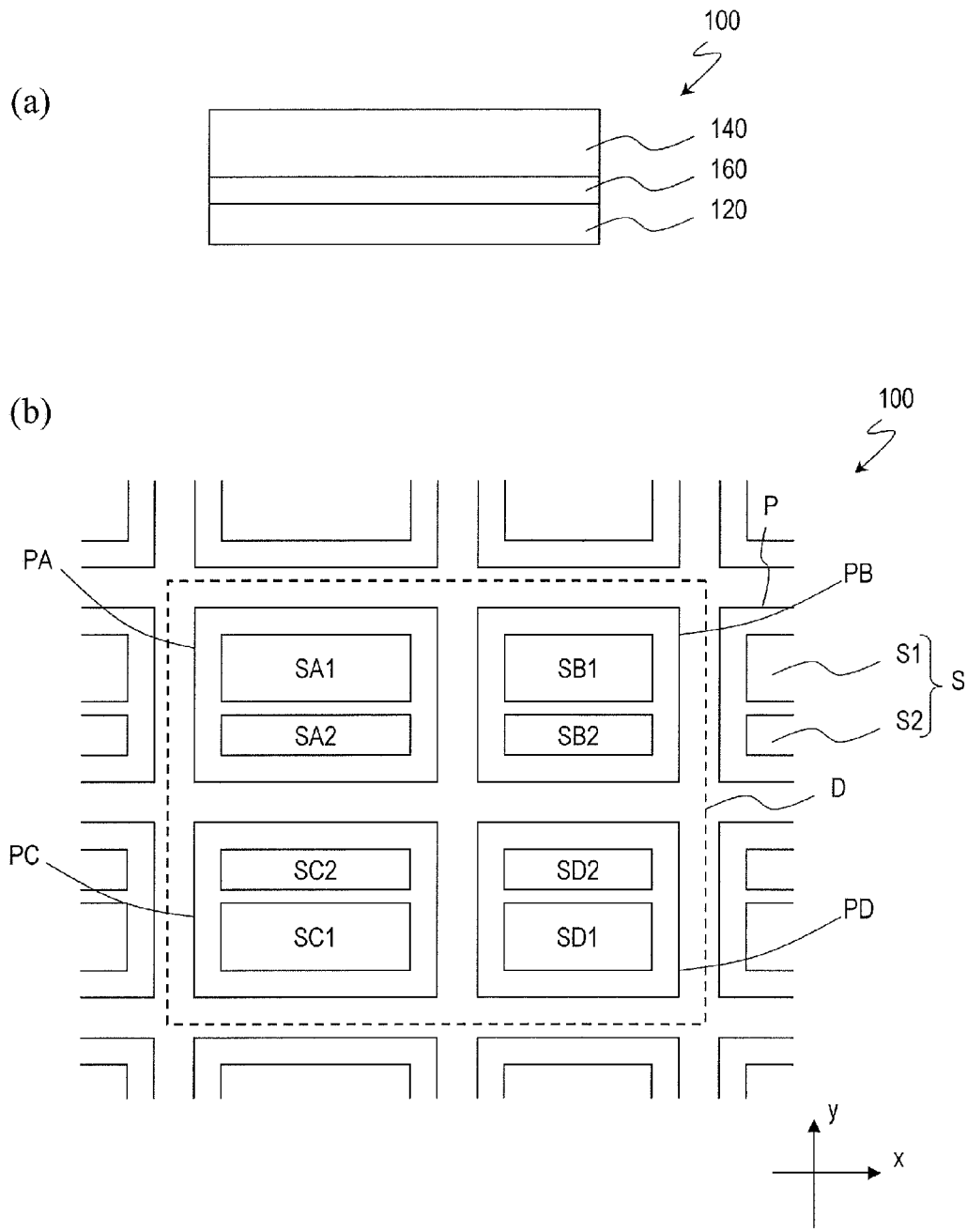
[FIG. 1]

FIG. 1(a) is a schematic view of a liquid crystal display device 100 in an embodiment according to the present invention. The liquid crystal display device 100 in this embodiment includes a rear substrate 120, a front substrate 140, and a liquid crystal layer 160 provided between the rear substrate 120 and the front substrate 140. Although not shown here, the rear substrate 120 typically includes source lines, an insulating layer, gate lines, thin film transistors, pixel electrodes, an alignment film and the like. The front substrate 140 typically includes a counter electrode, a color filter layer, an alignment film and the like. Outer to the rear substrate 120 and the front substrate 140, polarizing plates are provided.

For example, the alignment films are vertical alignment films, and the liquid crystal layer 160 is a vertical alignment type liquid crystal layer. Here, the "vertical alignment type liquid crystal layer" means a liquid crystal layer in which liquid crystal molecules are aligned such that the angle of axes thereof with respect to surfaces of the vertical alignment films (this angle is also referred to as the "axial azimuth angle") is about 85° or greater. The liquid crystal layer 160 contains a nematic liquid crystal material having negative dielectric anisotropy and is combined with the polarizing plates located in crossed Nicols to provide normally black mode display. When the liquid crystal display device 100 is of a transmissive type or a transreflective type, the liquid crystal display device 100 also includes a backlight unit.

The liquid crystal display device 100 includes a plurality of color display pixels arrayed in a matrix of a plurality of rows by a plurality of columns. A color display pixel acts as a display unit of an optional color. A color display pixel includes four or more pixels. In the case where, for example, red, green, blue and yellow are used as primary colors, the color display pixel includes a red pixel, a green pixel, a blue pixel and a yellow pixel. Each pixel is defined by a pixel electrode. The counter electrode is typically located so as to face all the pixel electrodes, but alternatively, the counter electrode may be provided as being divided into a plurality of blocks.

FIG. 1(b) is a schematic view of a color display pixel D in the liquid crystal display device 100. As described above, the liquid crystal display device 100 includes a plurality of color display pixels arrayed in a matrix of a plurality of rows by a plurality of columns. FIG. 1(b) shows one such color display pixel D and the vicinity thereof.

The color display pixel D includes a pixel PA, a pixel PB, a pixel PC and a pixel PD. Here, the pixels PA through PD display different colors from each other. The pixels PA through PD in one, same color display pixel D are arrayed in a matrix of a plurality of rows by a plurality of columns. The pixel PB is adjacent to the pixel PA in a row direction (x direction), and the pixel PC is adjacent to the pixel PA in a column direction (y direction). The pixel PD is adjacent to the pixel PB in the column direction and is adjacent to the pixel PC in the row direction. Thus, the pixel PD is adjacent to the pixel PA in an oblique direction, and the pixel PC is adjacent to the pixel PB in an oblique direction. As can be seen, in the liquid crystal display device 100, the pixels PA through PD are arrayed in two rows by two columns. In this case, as compared with the case where the pixels PA through PD are arrayed in one row or in one column, the color display pixels D having a small aspect ratio can be designed more easily and a better viewing angle characteristic can be realized.

FIG. 1(b) shows one color display pixel D and the vicinity thereof. In the liquid crystal display device 100, the color display pixels D arrayed in a matrix have the same pixel array as each other. Specifically, regarding the row direction, in one row, the pixels PA, PB, PA, PB, are arrayed, and in the next row, the pixels PC, PD, PC, PD, . . . are arrayed. Regarding the column direction, in one column, the pixels PA, PC, PA, PC, . . . are arrayed, and in the next column, the pixels PB, PD, PB, PD, . . . are arrayed. In this specification, the pixel PA, the pixel PB, the pixel PC and the pixel PD may be respectively referred to as the "first pixel PA", "second pixel PB", "third pixel PC" and "fourth pixel PD".

Here, the pixel PA and the pixel PC each have an area size larger than the size area of each of the pixel PB and the pixel PD. Specifically, the length of each of the pixels PA and PC in the column direction is approximately equal to the length of each of the pixels PB and PD in the column direction, but the length of each of the pixels PA and PC in the row direction is longer than the length of each of the pixels PB and PD in the row direction.

The plurality of pixels P each include a plurality of sub pixels S. Here, one pixel P includes two sub pixels S (i.e., sub pixel S1 and sub pixel S2). The sub pixel S1 and the sub pixel S2 included in the pixel P are arrayed in the column direction. The sub pixels S included in one color display pixel D are arrayed in a matrix of a plurality of rows by a plurality of pixels. Specifically, the sub pixels S included in one color display pixel D are arrayed in four rows by two columns. In this specification, the sub pixel S1 and the sub pixel S2 may be respectively referred to as the "first sub pixel S1" and "second sub pixel S2". In the following description, the sub pixels S1 in the pixels PA, PB, PC and PD may be respectively represented as the "sub pixel SA1", "sub pixel SB1", "sub pixel SC1" and "sub pixel SD1"; and the sub pixels S2 in the pixels PA, PB, PC and PD may be respectively represented as the "sub pixel SA2", "sub pixel SB2", "sub pixel SC2" and "sub pixel SD2".

Here, in each of the pixels PA through PD, the sub pixel S1 has an area size larger than the size area of the sub pixel S2. Specifically, in each of the pixels PA through PD, the length of each of the sub pixels SA1 through SD1 in the row direction is approximately equal to the length of each of the sub pixels SA2 through SD2 in the row direction, but the length of each of the sub pixels SA1 through SD1 in the column direction is longer than the length of each of the sub pixels SA2 through SD2 in the column direction.

At least at a certain intermediate gray scale level, the sub pixel S2 exhibits a luminance higher than the luminance of the sub pixel S1 in each of the plurality of pixels P. Typically, in an optional frame or field, the luminance of the sub pixel S2 is equal to or higher than the luminance of the sub pixel S1. The first sub pixel S1 is also referred to as the "dark sub pixel", and the second sub pixel S2 is also referred to as the "bright sub pixel".

By providing two sub pixels S1 and S2 exhibiting different luminances in one pixel P in this manner, the viewing angle dependence of the γ characteristic can be alleviated. By setting the area size of the sub pixel S1 exhibiting a lower luminance to be larger than the area size of the sub pixel S2 exhibiting a higher luminance, the viewing angle characteristic can be efficiently improved.

In the liquid crystal display device 100 in this embodiment, the sub pixel SA2 is adjacent to the sub pixel SB2 in the row direction and is adjacent to the sub pixel SC2 in the column direction. The sub pixel SD2 is adjacent to the sub pixel SB2 in the column direction and is adjacent to the sub pixel SC2 in the row direction. Thus, the sub pixel SA2 is adjacent to the sub pixel SD2 in an oblique direction, and the sub pixel SB2 is adjacent to the sub pixel SC2 in an oblique direction. As can be seen, in the liquid crystal display device 100, the sub pixels SA2 through SD2 are located at a center of the color display pixel D in the column direction. Regarding the dark sub pixels S1, the sub pixel SB1 is adjacent to the sub pixel SA1 in the row direction, and the sub pixel SD1 is adjacent to the sub pixel SC1 in the row direction.

Figure 2:
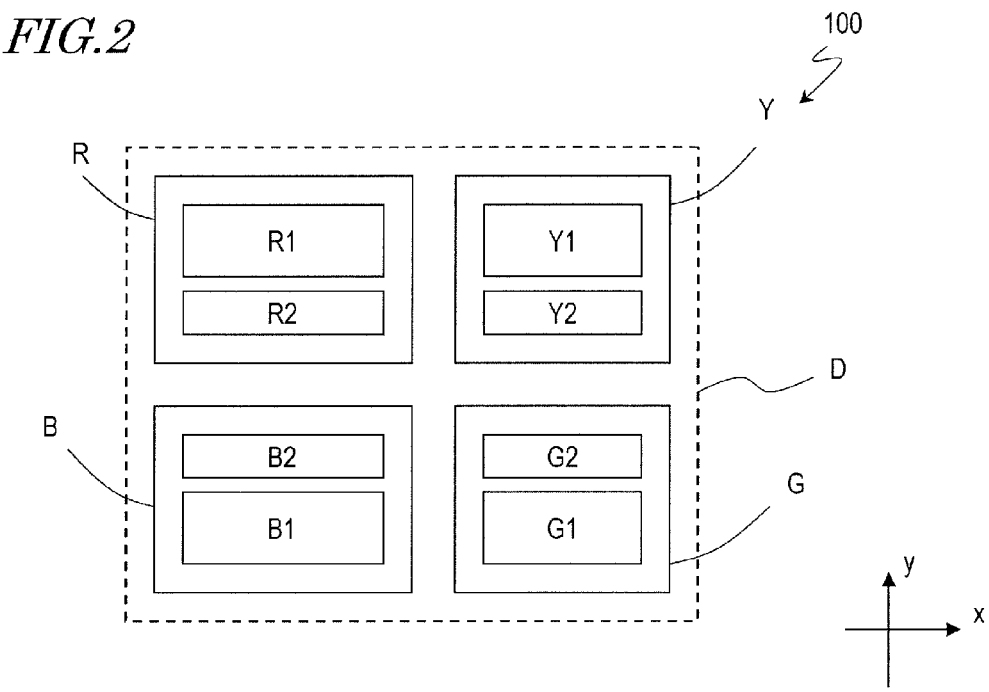
[FIG. 2]

FIG. 2 is a schematic view of the color display pixel D in the liquid crystal display device 100. Here, the pixels PA, PB, PC and PD are respectively a red pixel R, a yellow pixel Y, a blue pixel B and a green pixel G. For example, the color filter layer includes a red color filter for transmitting red light, a green color filter for transmitting green light, a blue color filter for transmitting blue light and a yellow color filter for transmitting yellow light in correspondence with the red pixel R, the green pixel G, the blue pixel B and the yellow pixel Y. The blue pixel B is adjacent to the red pixel R in the column direction, and the yellow pixel Y is adjacent to the blue pixel B in an oblique direction.

Regarding each of the red pixel R, the yellow pixel Y, the blue pixel B and the green pixel G, the sub pixel S1 is represented as the "sub pixel R1", "sub pixel Y1", "sub pixel B1" and "sub pixel G1"; and the sub pixel S2 is represented as the "sub pixel R2", "sub pixel Y2", "sub pixel B2" and "sub pixel G2". In the liquid crystal display device 100, the sub pixels R2, Y2, B2 and G2 are adjacent to each other in any of the row direction, the column direction and an oblique direction.

In the liquid crystal display device 100, the red pixel R and the blue pixel B each have an area size larger than the area size of each of the green sub pixel G and the yellow sub pixel Y. Since the area size of the red pixel R is relatively large, the liquid crystal display device 100 can sufficiently reproduce red having a high lightness. Since the area size of the blue pixel B is relatively large, the amount of a blue component transmitted through the color filter layer is increased, and the amount of each of the red and green components transmitted through the color filter layer is decreased. In this case, in order to realize a certain color temperature, it is needed to decrease the amount of the blue component of light emitted by the backlight unit and increase the amount of each of the red and green components of the light emitted by the backlight unit. Since the light emitting efficiency of the blue component is relatively low and the light emitting efficiency of the green component is relatively high, the light emitting efficiency of the light from the backlight unit can be improved by increasing the area size of the blue pixel B.

Figure 3:
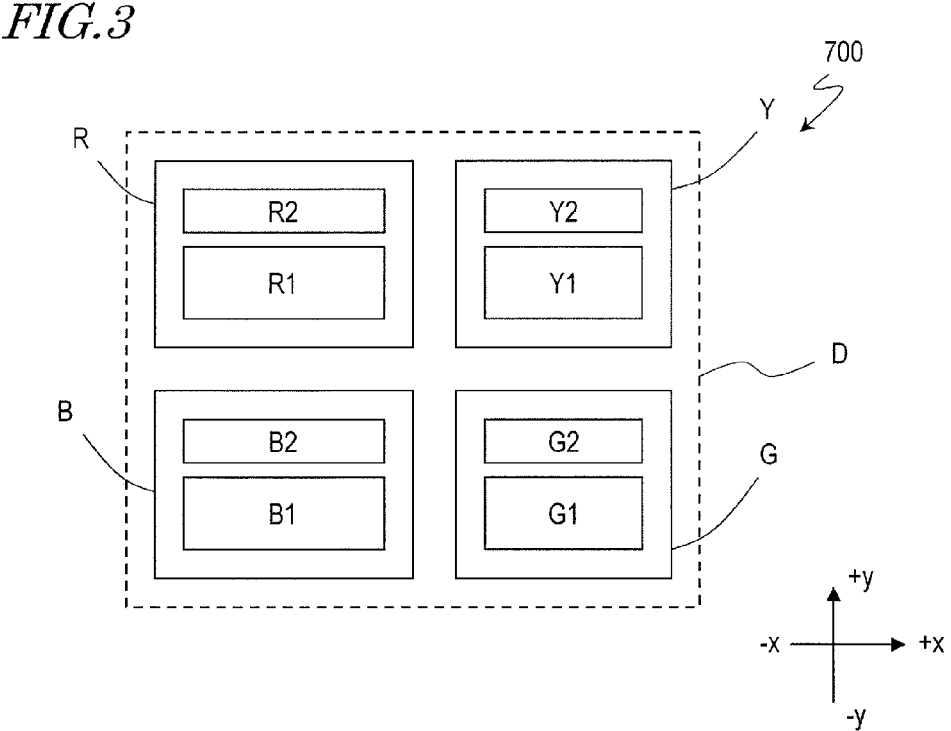
[FIG. 3]

Hereinafter, advantages of the liquid crystal display device 100 in this embodiment will be described as compared with a liquid crystal display device 700 as a comparative example. First, FIG. 3 is a schematic view of a color display pixel D in the liquid crystal display device 700 as the comparative example. In the liquid crystal display device 700, the blue pixel B is adjacent to the red pixel R in the column direction, and the yellow pixel Y is adjacent to the blue pixel B in an oblique direction. In the liquid crystal display device 700, in the red, yellow, blue and green pixels R, Y, B and G, the first sub pixels R1, Y1, B1 and G1 are provided on the negative side of the y direction, and the second sub pixels R2, Y2, B2 and G2 are provided on the positive side of the y direction.

Now, a video signal showing that a central area of the display plane is black and the area surrounding the central area is gray is input to each of the liquid crystal display device 700 as the comparative example and the liquid crystal display device 100 in this embodiment. In this case, the liquid crystal display devices 100 and 700 display a black window.

Figure 4:
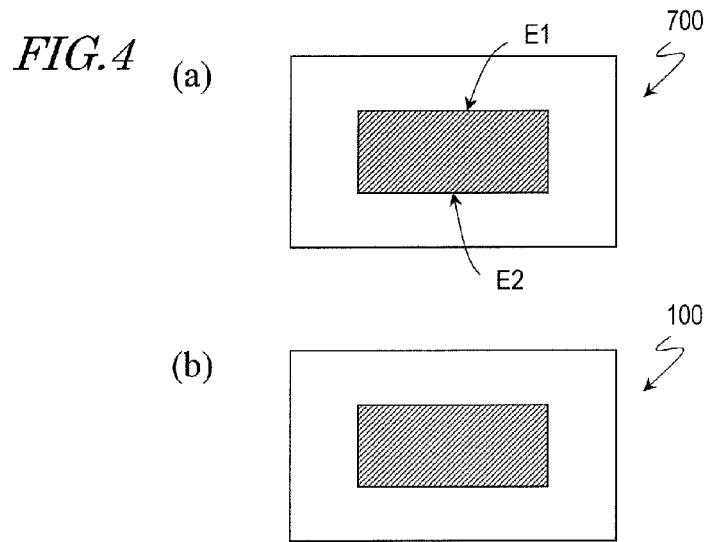
[FIG. 4]

FIG. 4(a) shows the display plane of the liquid crystal display device 700 as the comparative example. In the liquid crystal display device 700, an upper edge E1 and a lower edge E2 of the black window appear to be colored. Specifically, the upper edge E1 appears to be bluish green, and the lower edge E2 appears to be orange. A reason why the upper edge E1 appears to be colored is that in the liquid crystal display device 700, blue and green displayed by the blue pixel and the green pixel which are located in a lower area, in the color display pixels for displaying gray in the upper area of the window and the vicinity thereof, are not sufficiently mixed. Similarly, a reason why the lower edge E2 appears to be colored is that in the liquid crystal display device 700, red and yellow displayed by the red pixel and the yellow pixel which are located in an upper area, in the color display pixels for displaying gray in the lower area of the window and the vicinity thereof, are not sufficiently mixed. As can be seen, in the liquid crystal display device 700 as the comparative example, the colors may appear to blur.

FIG. 4(b) shows the display plane of the liquid crystal display device 100 in this embodiment. Unlike in the liquid crystal display device 700, in the liquid crystal display device 100, neither the upper edge nor the lower edge of the black window appears to be colored. In the liquid crystal display device 100, in an upper area of the black window, the sub pixels B2 and G2 exhibiting a higher luminance in the blue pixel B and the green pixel G are adjacent to the sub pixels R2 and Y2 exhibiting a higher luminance in the red pixel R and the yellow pixel Y, and therefore coloring is suppressed. Similarly, in a lower area of the black window, the sub pixels R2 and Y2 exhibiting a higher luminance in the red pixel R and the yellow pixel Y are adjacent to the sub pixels B2 and G2 exhibiting a higher luminance in the blue pixel B and the green pixel G, and therefore coloring is suppressed. As can be seen, in the liquid crystal display device 100, the sub pixels R2, Y2, B2 and G2 exhibiting a higher luminance are located to be adjacent to each other, and as a result, the colors are suppressed from blurring.

Figure 5:
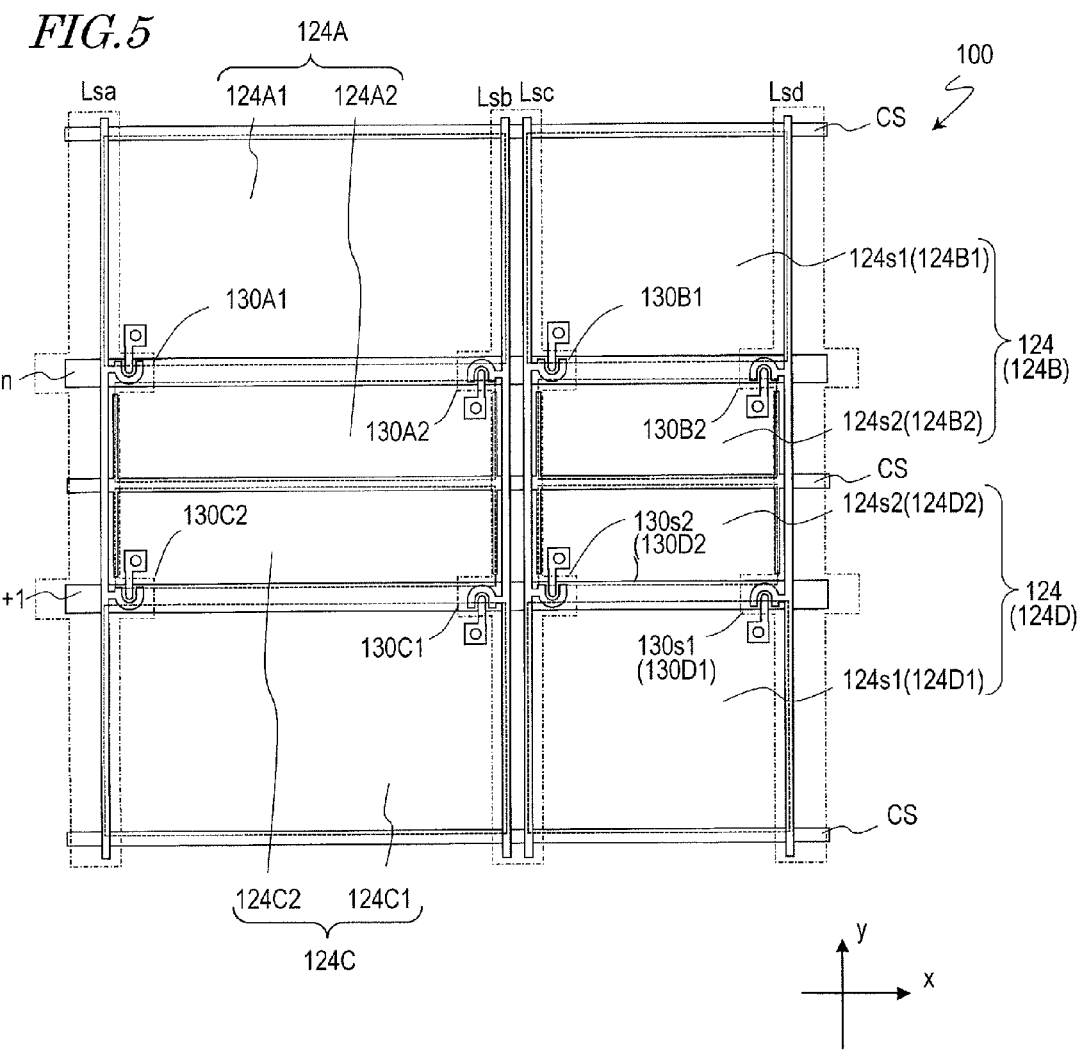
[FIG. 5]

FIG. 5 is a schematic view of the color display pixel D in the liquid crystal display device 100. FIG. 5 is a schematic view corresponding to one color display pixel D. Here, in order to avoid the figure from being excessively complicated, the counter electrode of the front substrate 140 and the like are omitted.

A pixel electrode 124 includes sub pixel electrodes 124s1 and 124s2. The pixel P is defined by the pixel electrode 124, and the sub pixels S1 and S2 are respectively defined by sub pixel electrodes 124s1 and 124s2. In this specification, the sub pixel electrodes 124s1 and 124s2 may be respectively referred to as the "first sub pixel electrode 124s1" and "second sub pixel electrode 124s2". Here, in each pixel electrode 124, the length of the sub pixel electrode 124s1 in the row direction is approximately equal to the length of the sub pixel electrode 124s2 in the row direction, but the length of the sub pixel electrode 124s1 in the column direction is longer that the length of the sub pixel electrode 124s2 in the column direction.

In the liquid crystal display device 100, thin film transistors (TFTs) 130s1 and 130s2 are respectively provided in correspondence with the sub pixel electrodes 124a1 and 124a2. In this specification, the TFTs 130s1 and 130s2 may be respectively referred to as the "first TFT 130s1" and "second TFT 130s2".

The storage capacitor lines CS are each provided to be shared by the sub pixel S1 and the sub pixel S2 adjacent to each other in the column direction in two pixels P adjacent to each other in the column direction. A voltage applied to the sub pixel electrodes 124s1 adjacent to each other is retained by the storage capacitor line CS extending in the row direction between such sub pixel electrodes 124s1. Similarly, a voltage applied to the sub pixel electrodes 124s2 adjacent to each other is retained by the storage capacitor line CS extending in the row direction between such sub pixel electrodes 124s2. Typically, the storage capacitor lines CS are formed in the same step as, and of the same material as, gate lines G.

In FIG. 5, the pixel electrodes 124 defining the pixels PA through PD are represented as the "pixel electrodes 124A through 124D". The sub pixel electrodes 124s defining the sub pixels SA1 through SD1 and SA2 through SD2 are respectively represented as the "sub pixel electrodes 124A1 through 124D1" and "sub pixel electrodes 124A2 through 124D2". In the following description, TFTs 130s1 of the sub pixels SA1 through SD1 may be represented as the "TFTs 130A1 through 130D1", and TFTs 130s2 of the sub pixels SA2 through SD2 may be represented as the "TFTs 130A2 through 130D2". In the liquid crystal display device 100, gates of the TFT 130A1, 130A2, 130B1 and 130B2 are electrically connected to a gate line Gn, and gates of the TFT 130C1, 130C2, 130D1 and 130D2 are electrically connected to a gate line Gn+1.

Two source lines Ls are provided for each column of pixels. The following description will be given regarding the column of pixels including the pixel PA and the pixel PC. Source lines Lsa and Lsb corresponding to this column of pixels are located to have the sub pixel electrodes 124A1, 124A2, 124C2 and 124C1 therebetween. Sources of the TFT 130A1 and the TFT 130C2 are electrically connected to the source line Lsa, and sources of the TFT 130A2 and the TFT 130C1 are electrically connected to the source line Lsb.

When a gate signal voltage supplied to the gate line Gn is turned ON from OFF, the TFTs 130A1 and 130A2 are put into an ON state, a source signal is supplied from the source line Lsa to the sub pixel electrode 124A1, and a source signal is supplied from the source line Lsb to the sub pixel electrode 124A2. At this point, the effective voltage of the sub pixel SA2 is higher than the effective voltage of the sub pixel SA1. The polarity of the sub pixel SA2 may be the same as, or different from, the polarity of the sub pixel SA1. Here, the "polarity" means the direction (polarity) of the electric field applied to the liquid crystal layer. For example, "+" shows that the potential of the counter electrode is higher than the potential of the sub pixel electrode, and "−" shows that the potential of the sub pixel electrode is higher than the potential of the counter electrode.

Next, when a gate signal voltage supplied to the gate line Gn+1 is turned ON, the TFTs 130C1 and 130C2 are put into an ON state, a source signal is supplied from the source line Lsa to the sub pixel electrodes 124C2, and a source signal is supplied from the source line Lsb to the sub pixel electrodes 124C1. At this point, the effective voltage of the sub pixel SP2 is higher than the effective voltage of the sub pixel SP1. The polarity of the sub pixel SC2 may be the same as, or different from, the polarity of the sub pixel SC1. The polarities of the sub pixels SA1, SA2, SC1 and SC2 may be of any combination. It should be noted that in the case where the polarity of the source signal voltage supplied from the source line Lsa is kept the same during a prescribed time period (preferably, 1 vertical scanning period), the power consumption of the source driver (not shown) can be suppressed. Similarly, in the case where the polarity of the source signal voltage supplied from the source line Lsb is kept the same during a prescribed time period (preferably, 1 vertical scanning period), the power consumption of the source driver (not shown) can be suppressed. As can be seen, in the liquid crystal display device 100, write to each pixel P is performed by two source lines Ls. In the case where two source lines Ls are provided for each column of pixels, the gap between the pixel electrodes 124 adjacent to each other in the row direction is relatively wide. In the liquid crystal display device 100, the pixels PA through PD are arrayed in two rows by two columns. In this case, a higher aperture ratio can be realized as compared with the case where the four pixels are arrayed linearly in the row direction.

Here, the "vertical scanning period" means a period from when a gate line is selected until the same gate is selected next time. In a conventional liquid crystal display device in which double speed driving is not performed, when the video signal is a non-interlace driving signal, 1 vertical scanning period corresponds to 1 frame period of the video signal, whereas when the video signal is an interlace driving signal, 1 vertical scanning period corresponds to 1 field of the video signal. For example, regarding an NTSC signal, 1 vertical scanning period in a liquid crystal display device is 16.7 msec, which is the inverse of the field frequency of the NTSC signal (60 Hz). In a liquid crystal display device, interlace driving is not performed and a signal voltage is written to all the pixels in both of an odd numbered field and an even numbered field. Therefore, the inverse of the field frequency of the NTSC signal is the vertical scanning period.

In FIG. 5, the storage capacitor lines CS are each provided in correspondence with a gap between sub pixels, adjacent to each other, included in two pixels adjacent to each other in the column direction. Alternatively, the storage capacitor lines CS may each be provided such that each sub pixel electrode 124s is astride a storage capacitor line CS.

In the case where the liquid crystal display device 100 is of a vertical alignment type, in order to realize a wide viewing angle characteristic, it is preferable that each sub pixel has four liquid crystal domains located at positions shifted from each other by an angle which is an integral multiple of 90°. For example, it is assumed that the 3 o'clock direction of a clock face is 0° and the counterclockwise direction is the positive direction. In this case, it is preferable that where a pair of polarizing plates are located in crossed Nicols such that the axis of one polarizing plate extends in the 0°-180° direction and the axis of the other polarizing plate extends in the 90°-270° direction, a plurality of liquid crystal domains (typically, including four liquid crystal domains, the directors of which have azimuth angles of 45°, 135°, 225° and 315° at least when a voltage is applied to the liquid crystal layer) are formed in each sub pixel or each pixel.

A liquid crystal display device in which each sub pixel has four liquid crystal domains is disclosed in Japanese Laid-Open Patent Publication No. 2004-62146 (U.S. Pat. No. 6,958,791) filed by the present applicant. The entirety of Japanese Laid-Open Patent Publication No. 2004-62146 (U.S. Pat. No. 6,958,791) is incorporated herein by reference.

The liquid crystal display device 100 may be of the so-called MVA mode. In an MVA mode liquid crystal display device, linear slits formed in electrodes and linear dielectric projections (ribs) formed on the electrodes on the liquid crystal layer side are located, on the pair of substrates facing each other while having a liquid crystal layer therebetween, to be parallel to, and alternate to, each other when seen in a direction normal to the substrates. Owing to this, the azimuth directions of the directors of the liquid crystal domains formed at the time of voltage application is regulated. The azimuth direction of each liquid crystal domain is perpendicular to the azimuth direction in which the linear slits or dielectric projections (collectively referred to as the "linear structures") extend.

The liquid crystal display device 100 may be of the PSA mode. The polymer sustained alignment technology (hereinafter, referred to as the "PSA technology") is disclosed in, for example, Japanese Laid-Open Patent Publications Nos.

2002-357830, 2003-177418 and 2006-78968, and K. Hanaoka et al., "A New MVA-LCD by Polymer Sustained Alignment Technology", SID 04 DIGEST 1200-1203 (2004). The disclosures of these four documents are entirely incorporated herein by reference.

According to the PSA technology, the pretilt direction of the liquid crystal molecules is controlled as follows. A small amount of polymerizable compound (e.g., a photopolymerizable monomer or oligomer) is mixed in a liquid crystal material. After a liquid crystal cell is assembled, the polymerizable compound is irradiated with active energy rays (e.g., ultraviolet rays) in the state where a prescribed voltage is applied to the liquid crystal layer. The pretilt direction of the liquid crystal molecules is controlled by the polymer which is thus generated. The alignment state of the liquid crystal molecules realized when the polymer is generated is maintained (stored) even after the voltage is removed (in the absence of the voltage). Herein, the layer formed of the polymer will be referred to as an "alignment sustaining layer". The alignment sustaining layer is formed on a surface of each of alignment films (on the liquid crystal layer side). The alignment sustaining layer does not need to be in the form of a film covering the surfaces of the alignment films, and may be in the form of particles of the polymer discretely provided.

The PSA technology has an advantage of adjusting the pretilt azimuth and the pretilt angle of the liquid crystal molecules by controlling the electric field or the like formed in the liquid crystal layer. In addition, an alignment sustaining layer expresses an alignment regulating force on substantially the entire plane thereof contacting the liquid crystal layer and thus provides a high response characteristic.

Figure 6:
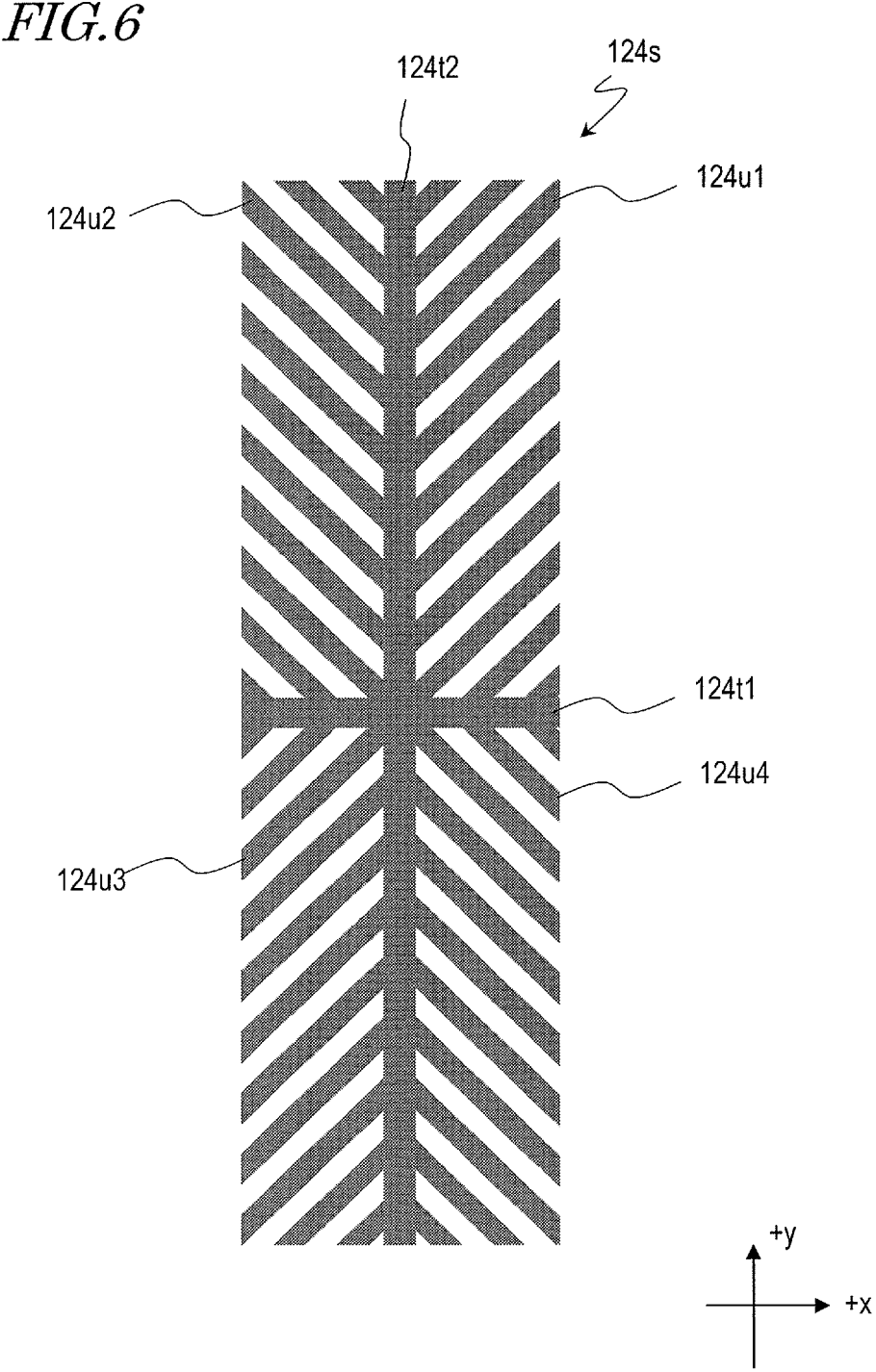
[FIG. 6]

A liquid crystal display device of the PSA mode is obtained by, for example, using a sub pixel electrode 124s shown in FIG. 6 and applying the PSA technology described above.

The sub pixel electrode 124s includes cross-shaped trunk portions 124t1 and 124t2 located to overlap the polarizing axes of the pair of polarizing plates and a plurality of branch portions 124u1, 124u2, 124u3 and 124u4 extending in a direction of about 45° with respect to the cross-shaped trunk portions 124t1 and 124t2.

The trunk portion 124t1 extends in the row direction (x direction), and the trunk portion 124t2 extends in the column direction (y direction). Where the azimuth angle of the +x direction is 0°, the branch portions 124u1 extend in an azimuth angle of 45° from the trunk portions 124t1 and 124t2, the branch portions 124u2 extend in an azimuth angle of 135° from the trunk portions 124t1 and 124t2, the branch portions 124u3 extend in an azimuth angle of 225° from the trunk portions 124t1 and 124t2, and the branch portions 124u3 extend in an azimuth angle of 315° from the trunk portions 124t1 and 124t2. The liquid crystal molecules in the liquid crystal layer of the vertical alignment type (having negative dielectric anisotropy) are tilted in directions in which the corresponding branch portions extend because of oblique electric fields from the trunk portions and the branch portions. A reason for this is that an oblique electric field from the branch portions extending parallel to each other acts to tilt the liquid crystal molecules in an azimuth direction perpendicular to the direction in which the branch portions extend, and an oblique electric field from the trunk portions act to tilt the liquid crystal molecules in directions in which the corresponding branch portions extend. By use of the PSA technology, the above-described alignment of the liquid crystal molecules which is formed when a voltage is applied to the liquid crystal layer can be stabilized.

Alternatively, the liquid crystal display device of the vertical alignment type may use an optical alignment film as the alignment film. Typically, optical alignment films each having areas, in which alignment treatment has been performed in antiparallel directions, in each sub pixel are provided on both of the rear substrate 120 and the front substrate 140. The pair of alignment films are located such that the alignment treatment directions of areas facing each other are perpendicular to each other. The liquid crystal molecules in the vicinity of the optical alignment films are slightly tilted with respect to the direction normal to the main surfaces of the optical alignment films. Such an optical alignment film may be provided on either the rear substrate 120 or the front substrate 140.

In the above description, the liquid crystal display device is of the vertical alignment type, but the present invention is not limited to this. The liquid crystal display device may be of any other mode.

In the above description, two TFTs are provided in each pixel P. The sub pixel electrodes 124s1 and 124s2 in each pixel P are supplied with a source signal from different source lines Ls. The present invention is not limited to this.

Hereinafter, with reference to FIG. 7 through FIG. 10, a liquid crystal display device in another embodiment according to the present invention will be described.

Figure 7:
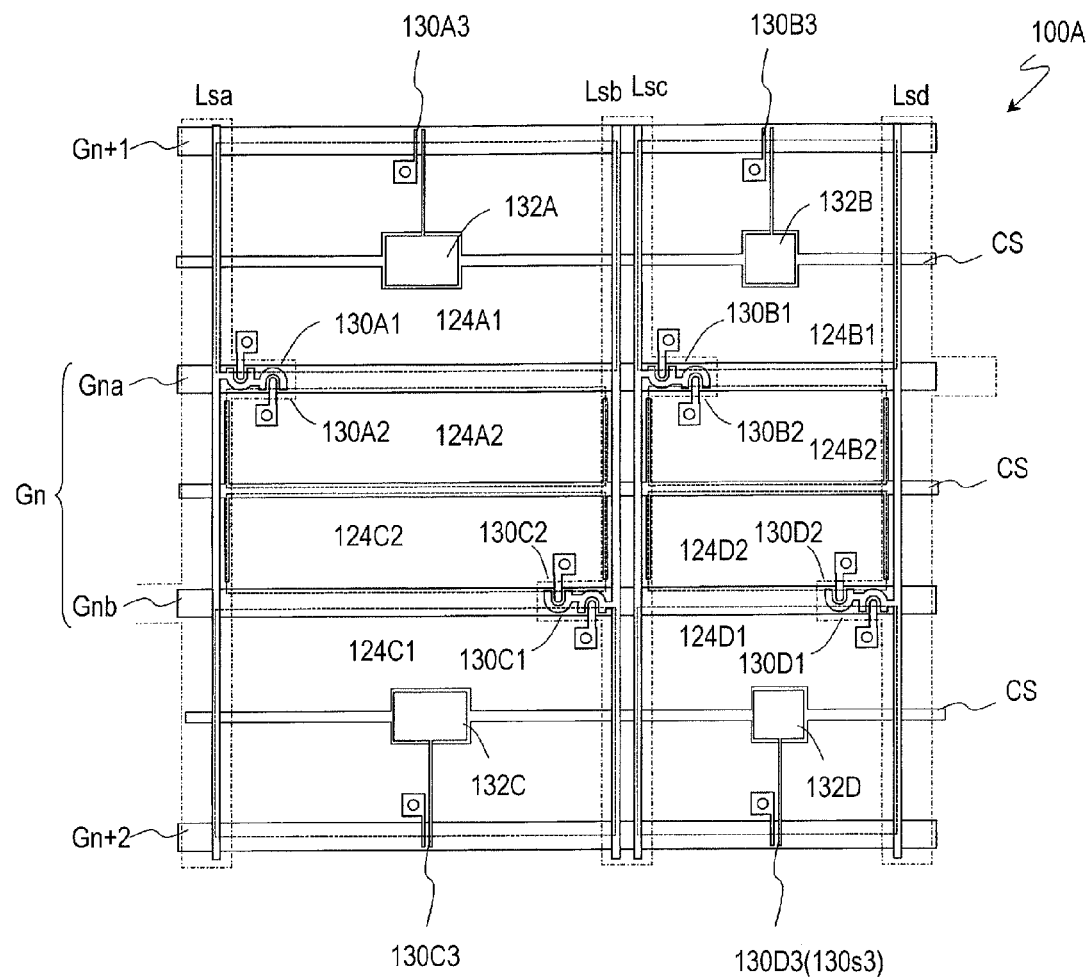
[FIG. 7]

FIG. 7 is a schematic view of a liquid crystal display device 100A. The liquid crystal display device 100A has substantially the same structure as that of the liquid crystal display device 100 described above except that in the liquid crystal display device 100A, write to one pixel P is performed by one source line and three TFTs are provided in each pixel P. In order to avoid redundancy, the same description will not be repeated.

In the liquid crystal display device 100A, a pair of source lines Ls are provided for each column of pixels. Write to one row of pixels P is performed by one source line Ls, and write to an adjacent row of pixels P is performed by the other source line Ls.

In the liquid crystal display device 100A, three TFTs are provided in each pixel P. Specifically, TFT 130A1 through 130A3 are provided in the pixel PA, and similarly, the TFTs 130B1 through 130B3, 130C1 through 130C3, and 130D1 through 130D3 are respectively provided in pixels PB through PD. Drains of the TFT 130A3 through 130D3 are electrically connected to storage capacitor electrodes 132A through 132D respectively. The storage capacitor electrodes 132A through 132D respectively overlap the sub pixel electrodes 124A1 through 124D1, and are located between the sub pixel electrodes 124A1 through 124D1 and the storage capacitor lines CS as seen in a thickness direction of the rear substrate 120. Typically, the storage capacitor electrodes 132A through 132D are formed in the same step as, and of the same material as, the source lines Ls.

The gate line Gn is branched into two gates lines Gna and Gnb. Gates of the TFTs 130A1, 130A2, 130B1 and 130B2 are electrically connected to the gate line Gna. Similarly, gates of the TFTs 130C1, 130C2, 130D1 and 130D2 are electrically connected to the gate line Gnb. The gate lines Gna and Gnb are supplied with equivalent gate signals, and the pixels PA through PD in one, same color display pixel P are all selected at the same time. Since the pixels PA through PD arrayed in a plurality of rows are all selected at the same time as described above, the write time to each of the pixels PA through PD can be made relatively long.

Gates of the TFTs 130A3 and 130B3 are electrically connected to the gate line Gn+1, and gates of the TFTs 130C3 and 130D3 are electrically connected to a gate line Gn+2. In the liquid crystal display device 100A, after the sub pixel electrodes 124A2 through 124D2 are supplied with the source signals from the source lines Lsa and Lsb, the TFTs 130A3 through 130D3 are selected and absolute values of the voltages applied to the sub pixel electrodes 124A2 through 124D2 are decreased. In this specification, the TFTs 130A3 through 130D3 may be referred to as the "third TFTs 130s3".

The following description will be given regarding the TFTs 130A1 through 130A3 and 130C1 through 130C3. The gates of the TFTs 130A1 and 130A2 are electrically connected to the gate line Gna, and sources of the TFTs 130A1 and 130A2 are electrically connected to the source line Lsa. Drains of the TFTs 130A1 and 130A2 are electrically connected to the sub pixel electrodes 124A1 and 124A2 respectively. The gate of the TFT 130A3 is electrically connected to the gate line Gn+1. A source of the TFT 130A3 is electrically connected the sub pixel electrode 124A1. The drain of the TFT 130A3 is electrically connected to the storage capacitor electrode 132A, and the storage capacitor electrode 132A forms capacitance coupling with the storage capacitor line CS.

Similarly, the gates of the TFTs 130C1 and 130C2 are electrically connected to the gate line Gnb, and sources of the TFTs 130C1 and 130C2 are electrically connected to the source line Lsb. Drains of the TFTs 130C1 and 130C2 are electrically connected to the sub pixel electrodes 124C1 and 124C2 respectively. The gate of the TFT 130C3 is electrically connected to the gate line Gn+2, and a source of the TFT 130C3 is electrically connected to the sub pixel electrode 124C1. A drain of the TFT 130C3 is electrically connected to the storage capacitor electrode 132C, and the storage capacitor electrode 132C forms capacitance coupling with the storage capacitor line CS.

Here, as the gate line Gn, the branched gate lines Gna and Gnb for selecting the color display pixels D of the n'th row are shown. Alternatively, the gate line Gn may further include extended lines which are electrically connected to the gates of the third TFT 130A3 through 130D3 of the color display pixels D of the (n−2) th and (n−1) th rows.

As described above, the TFTs 130A3 and 130B3 are electrically connected to the gate line Gn+1, and the gates of the TFTs 130C3 and 130D3 are electrically connected to the gate line Gn+2. Here, where the color display pixels D of the n'th and (n+1) th rows are represented as Dn and Dn+1, the gate of the TFT 130C3 of the pixel SC in the color display pixel D and the gate of the TFT 130A3 of the pixel SA in the color display pixel Dn+1 are both electrically connected to the gate line Gn+2. As can be seen, the third TFTs 130s3 of the pixels adjacent to each other in the color display pixels D adjacent to each other in the column direction share a gate line. Owing to this, the decrease of the aperture ratio can be suppressed.

Figure 8:
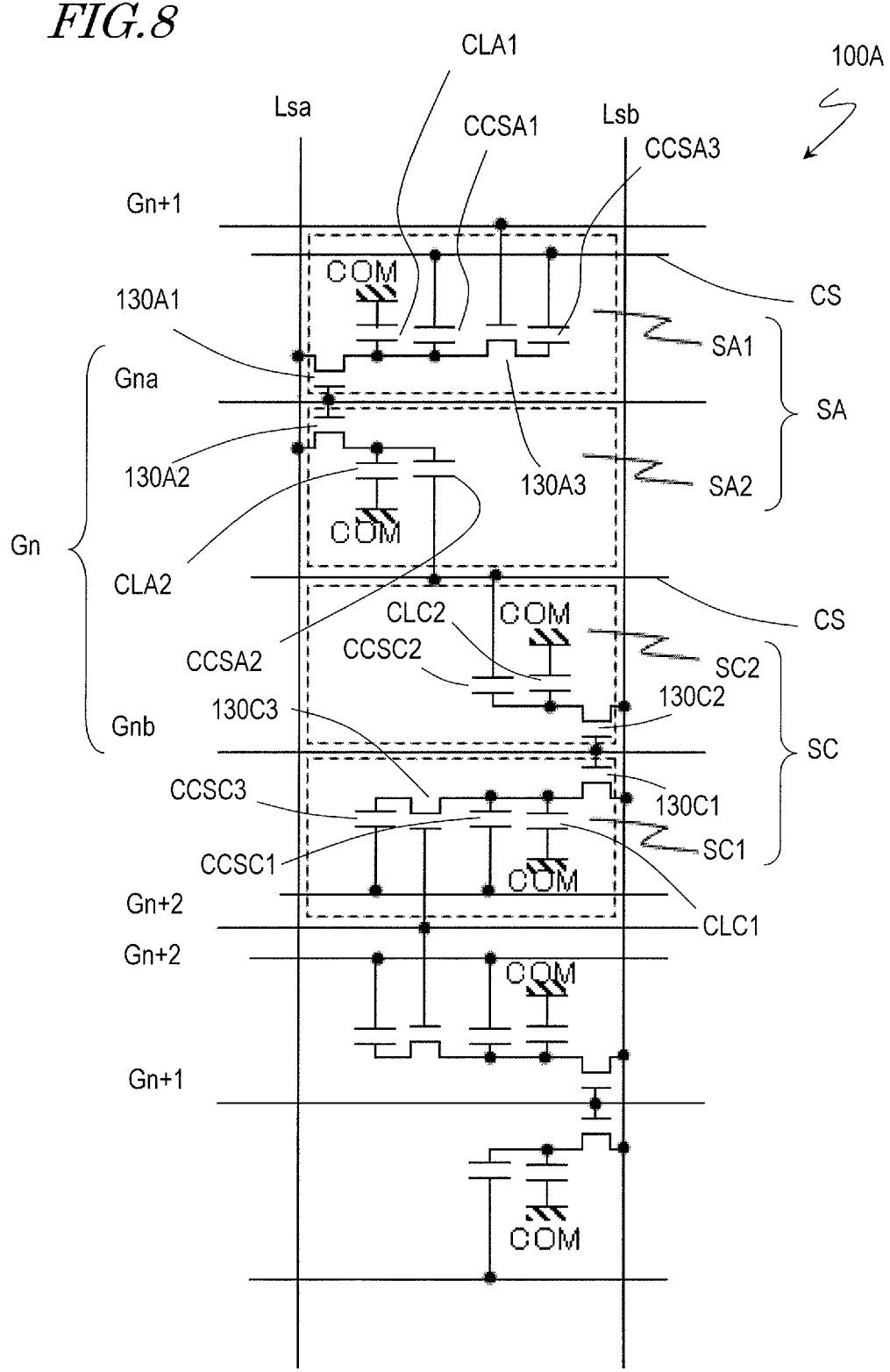
[FIG. 8]

FIG. 8 is an equivalent circuit diagram of the liquid crystal display device 100A. FIG. 8 shows an equivalent circuit of the pixel PA and the pixel PC.

First, the sub pixels SA1 and SA2 will be described. The sub pixel SA1 has a liquid crystal capacitor CLA1, a storage capacitor CCSA1 and a storage capacitor CCSA3. The liquid crystal capacitor CLA1 is formed by the sub pixel electrode 124A1, the counter electrode and the liquid crystal layer 160 located therebetween. The counter electrode is supplied with a common voltage COM. Here, the storage capacitor CCSA1 is formed by the sub pixel electrode 124A1, the storage capacitor line CS and the insulating layer located therebetween. The storage capacitor CCSA3 is formed by the storage capacitor electrode 132A, the storage capacitor line CS and the insulating layer located therebetween.

The sub pixel SA2 has a liquid crystal capacitor CLA2 and a storage capacitor CCSA2. The liquid crystal capacitor CLA2 is formed by the sub pixel electrode 124A2, the counter electrode and the liquid crystal layer 160 located therebetween. Here, the storage capacitor CCSA2 is formed by the sub pixel electrode 124A2, the storage capacitor line CS and the insulating layer located therebetween.

Next, the sub pixels SC1 and SC2 will be described. Similarly, the sub pixel SC1 has a liquid crystal capacitor CLC1, a storage capacitor CCSC1 and a storage capacitor CCSC3. The sub pixel SC2 has a liquid crystal capacitor CLC2 and a storage capacitor CCSC2.

The liquid crystal display device 100A having such a structure is driven as follows. When a gate signal voltage supplied to the gate line Gn is turned ON from OFF, the TFTs 130A1, 130A2, 130C1 and 130C2 are put into an ON state, a source signal is supplied from the source line Lsa to the sub pixel electrodes 124A1 and 124A2, and a source signal is supplied from the source line Lsb to the sub pixel electrodes 124C1 and 124C2. Then, the gate signal voltage supplied to the gate line Gn is turned OFF from ON, and the TFTs 130A1, 130A2, 130C1 and 130A1, 130C2 are put into an OFF state.

Next, when a gate signal voltage supplied to the gate line Gn+1 is turned ON from OFF. As a result, the TFT 130A3 is put into an ON state, and the voltage of the sub pixel electrode 124A1 is changed in accordance with the voltage with which the storage capacitor CCSA3 has been charged. Similarly, a gate signal voltage supplied to the gate line Gn+2 is turned ON from OFF. As a result, the TFT 130C3 is put into an ON state, and the voltage of the sub pixel electrode 124C1 is changed in accordance with the voltage with which the storage capacitor CCSC3 has been charged.

In general, the polarity of the voltage applied to the sub pixel electrodes 124s1 and 124s2 is inverted at a prescribed time period (typically, 1 vertical scanning period (e.g., 1 frame period or 1 field period)).

The storage capacitor CCSA3 is charged with the voltage of the polarity of 1 vertical scanning period before. The polarity of the voltage is different from the polarity of the voltage supplied to the sub pixel electrode 124A1 from the source line Lsa via the TFT 130A1. Therefore, when the TFT 130A3 is selected, the potential of the sub pixel electrode 124A1 is decreased. Then, the gate signal voltage supplied to the gate line Gn+1 is turned OFF from ON. As can be seen, since the TFT 130A3 is provided, the absolute value of the voltage applied to the liquid crystal layer 160 in correspondence with the sub pixel SA1 is decreased as compared with the absolute value of the voltage applied to the liquid crystal layer 160 in correspondence with the sub pixel SA2.

Similarly, the storage capacitor CCSC3 is charged with the voltage of the polarity of 1 vertical scanning period before. The polarity of the voltage is different from the polarity of the voltage supplied to the sub pixel electrode 124C1 from the source line Lsb via the TFT 130C1. Therefore, when the TFT 130C3 is selected, the potential of the sub pixel electrode 124C1 is decreased. Then, the gate signal voltage supplied to the gate line Gn+2 is turned OFF from ON. As can be seen, since the TFT 130C3 is provided, the absolute value of the voltage applied to the liquid crystal layer 160 in correspondence with to the sub pixel SC1 is decreased as compared with the absolute value of the voltage applied to the liquid crystal layer 160 in correspondence with to the sub pixel SC2.

As described above, the luminance of the sub pixels SA1 and SC1 can be made lower than the luminance of the sub pixel SA2 and SC2. Here, the pixels PA and PC have been described. As can be understood from the above description, since the pixels PB and PD have substantially the same structure as that of the pixels PA and PC, the luminance of the sub pixels SB1 and SD1 can be made lower than the luminance of the sub pixels SB2 and SD2. By utilizing this, the viewing angle dependence of the γ characteristic can be alleviated.

As can be seen, in the liquid crystal display device 100A, whether the source signal voltage applied to the plurality of source lines Ls in an optional vertical scanning period may have the positive polarity or the negative polarity, the bright sub pixels of each pixel included in the color display pixel D can be made adjacent to each other. However, it is preferable that the source signal voltages applied to the two source lines Ls provided for each column of pixels in an optional vertical scanning period have different polarities from each other. It is also preferable that when the color display pixels D each include pixels arrayed in two rows by two columns and the color display pixels D adjacent to each other in the row direction have the same pixel array, the corresponding pixels in these two color display pixels D have polarities inverted to each other.

Now, with reference to FIG. 9, the polarity of the pixel in the liquid crystal display device 100A will be described.

Figure 9:
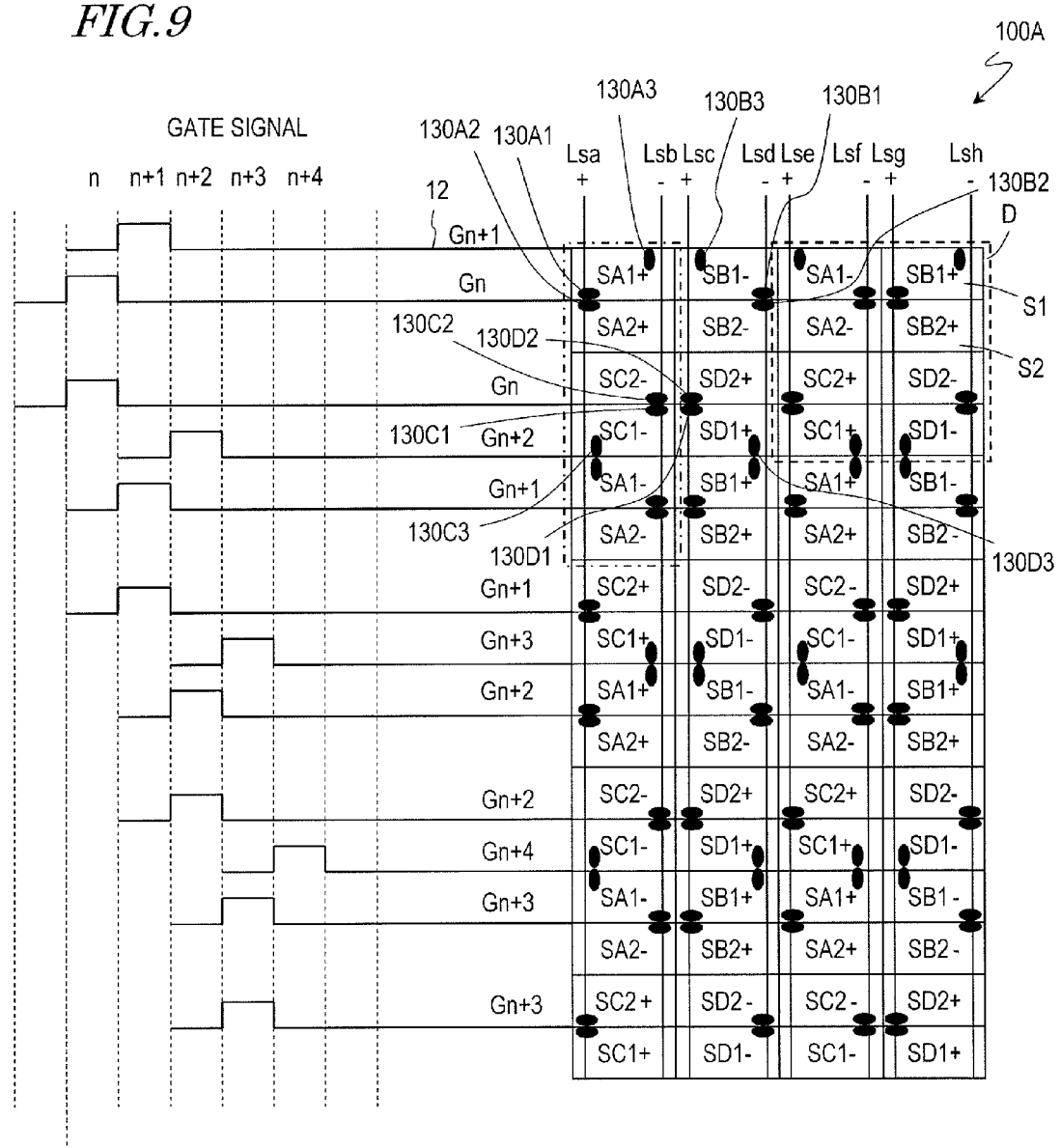
[FIG. 9]

FIG. 9 shows the waveforms of the gate signals supplied to the gate lines G and the color display pixels D arrayed in four rows by two column in the liquid crystal display device 100A. The gate signal voltages supplied to the gate lines Gn, Gn+1, Gn+2, . . . are sequentially turned ON from OFF every horizontal scanning period. In FIG. 9, for the purpose of simplifying the figure, the area size of the sub pixel S1 is shown as being equal to the area size of the sub pixel S2.

In the liquid crystal display device 100A, the color display pixels D arrayed in a matrix have substantially the same pixel array. Regarding the color display pixels D arrayed in a matrix, "+" shows that the polarity of the source signal supplied to the source line Ls is positive, and "−" shows that the polarity of the source signal supplied to the source line Ls is negative. Here, the sub pixels SA1 through SD1 and SA2 through SD2 having the positive polarity are represented as the "sub pixels SA1+ through SD1+ and SA2+ through SD2+", and the sub pixels SA1 through SD1 and SA2 through SD2 having the negative polarity are represented as the "sub pixels SA1− through SD1− and SA2− through SD2−". As described above, in the liquid crystal display device 100A, since the third TFTs 130A3 through 130D3 are provided, the sub pixels SA2+, SA2−, SB2+, SB2−, SC2+, SC2−, SD2+ and SD2− exhibit a higher luminance than that of the sub pixels SA1+, SA1−, SB1+, SB1−, SC1+, SC1−, SD1+ and SD1−, respectively.

In the liquid crystal display device 100A, the pair of source lines Ls are provided for each column of pixels. Here, at an optional time, source signals having inverted polarities to each other are respectively supplied to the pair of source lines Ls adjacent to each other. For example, the column of pixels including the pixel PA specified by the gate line Gn and the source line Lsa corresponds to the source lines Lsa and Lsb. When a source signal of the positive polarity is supplied to the source line Lsa, a source signal of the negative polarity is supplied to the source line Lsb. Here, the source signals supplied to the two source lines Ls provided between two adjacent columns of pixels have polarities inverted to each other.

In the liquid crystal display device 100A, the four pixels PA through PD in the color display pixel D correspond to the source lines Ls. For example, regarding the color display pixel D including the pixel PA specified by the gate line Gn and the source line Lsa, the sources of the TFTs 130A1 and 130A2 are electrically connected to the source line Lsa, and the sources of the TFTs 130C1 and 130C2 are electrically connected to the source line Lsb. Sources of the TFTs 130D1 and 130D2 are electrically connected to a source line Lsc, and sources of the TFTs 13081 and 13082 are electrically connected to a source line Lsd.

Here, the pixels adjacent to each other in the column direction in one, same color display pixel D have different polarities. For example, regarding the color display pixel D including the pixel PA specified by the gate line Gn and the source line Lsa, the pixels PA and PC adjacent to each other in the column direction in the color display pixel D have polarities inverted to each other. Specifically, the sources of the TFTs 130A1 and 130A2 are electrically connected to the source line Lsa, which is supplied with a source signal of the positive polarity; and the sources of the TFTs 130C1 and 130C2 are electrically connected to the source line Lsb, which is supplied with a source signal of the negative polarity.

Here, the source lines Ls are connected to non-corresponding pixels in the color display pixels D adjacent to each other in the column direction. For example, where the color display pixels D of the n'th and (n+1)th rows are represented as Dn and Dn+1, the source line Lsa is electrically connected to the sources of the TFTs 130A1 and 130A2 of the color display pixel Dn and also to the sources of the TFTs 130C1 and 130C2 of the color display pixel Dn+1. The source line Lsb is electrically connected to the sources of the TFTs 130C1 and 130C2 of the color display pixel Dn and also to the sources of the TFTs 130A1 and 130A2 of the color display pixel Dn+1. As can be seen, the source line Lsa is supplied with a source signal of the positive polarity for a certain vertical scanning period, and the source line Lsb is supplied with a source signal of the negative polarity for the same vertical scanning period. As a result, the power consumption of the source driver can be decreased.

Here, the corresponding pixels in the color display pixels D adjacent to each other in the column direction have polarities inverted to each other. For example, the pixel PA specified by the gate line Gn and the source line Lsa, and the pixel PA in the color display pixel D adjacent in the column direction to the color display pixel D including the above-specified pixel PA, have polarities inverted to each other. In this manner, the corresponding pixels in the color display pixels D adjacent to each other in the column direction have polarities inverted to each other. Therefore, flicker in the column direction is suppressed.

Here, regarding the color display pixel D including the pixel PA specified by the gate line Gn and the source line Lsa, the pixels PA and PB adjacent to each other in the row direction in the color display pixel D have polarities inverted to each other. Specifically, the sources of the TFTs 130A1 and 130A2 are electrically connected to the source line Lsa supplied with a source signal of the positive polarity, and the sources of the TFTs 13081 and 130B2 are electrically connected to the source line Lsd supplied with a source signal of the negative polarity.

In the liquid crystal display device 100A, the corresponding pixels in two color display pixels D adjacent to each other in the row direction have polarities inverted to each other. For example, regarding the color display pixel D including the pixel PA specified by the gate line Gn and the source line Lsa, and the pixel PA in the color display pixel D adjacent in the row direction to the above-mentioned color display pixel D, one of the pixels PA is supplied with a source signal of the positive polarity from the source line Lsa, and the other pixel PA is supplied with a source signal of the negative polarity from a source line Lsf. In this manner, the corresponding pixels in the color display pixels D adjacent to each other in the row direction have polarities inverted to each other. Therefore, flicker in the row direction is suppressed.

Regarding the corresponding pixels in the color display pixels D adjacent to each other in the row direction, the column direction and an oblique direction, the pixels adjacent to each other in the row direction and in the column direction have polarities inverted to each other, and the pixels adjacent to each other in an oblique direction have the same polarity. For example, the pixel PA specified by the gate line Gn and the source line Lsa, and the pixel PA in the color display pixel D adjacent in the row direction, in the column direction or an oblique direction to the color display pixel D including the above-specified pixel PA, will be described. When the pixel PA specified by the gate line Gn and the source line Lsa has the positive polarity, the pixel PA in the color display pixel D adjacent in the row direction has the negative polarity, the pixel PA in the color display pixel D adjacent in the column direction has the negative polarity, and the pixel PA in the color display pixel D adjacent in an oblique direction has the positive polarity.

Figure 10:
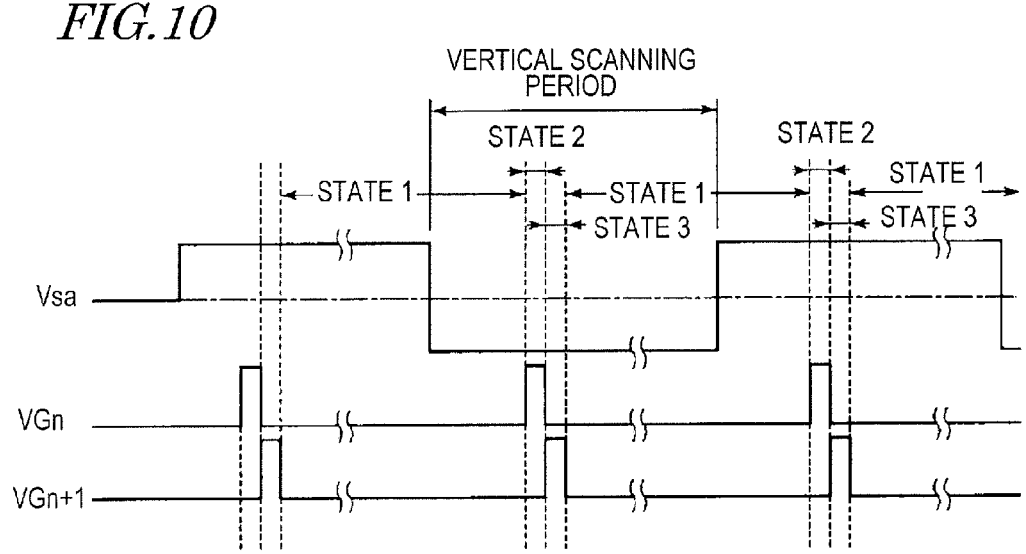
[FIG. 10]

Hereinafter, with reference to FIG. 10, the change of the polarity of the source signal in a plurality of vertical scanning periods will be described. The following description will be given regarding the pixel PA. Vsa represents a waveform of the source signal supplied to the source line Lsa, VGn represents a waveform of the gate signal supplied to the gate line Gn, and VGn+1 represents a waveform of the gate signal supplied to the gate line Gn+1. In FIG. 10, the horizontal direction represents the time, and the vertical direction represents the voltage level. Here, in order to avoid the figure from being excessively complicated, the gray scale levels of all the pixels are made constant throughout the plurality of vertical scanning periods. In the following description, a sum of the liquid crystal capacitor CLA1 and the storage capacitor CCSA1 of the sub pixel SA1 is represented as capacitor C1, and the storage capacitor CCSA3 is represented as capacitor C2.

As described later, when the gate signal voltages supplied to the gate lines Gn and Gn+1 are both OFF (state 1 in FIG. 10), namely, when the TFTs 130A1, 130A2 and 130A3 are all in an OFF state, the voltages of the capacitors C1 and C2 are approximately equal to each other. In this case, charge Q1 stored in the capacitor C1 is $Q1=C1\times V1$, and charge Qb1 stored in the capacitor C2 is $Qb1=C2\times V1$.

When the gate signal voltage supplied to the gate line Gn is turned ON (state 2 in FIG. 10), the TFTs 130A1 and 130A2 are put into an ON state. As a result, the voltage of the capacitor C2 becomes V2 (e.g., $V2 \neq V1$). At this point, the charge Q2 stored in the capacitor C1 is $Q2=C1\times V1$. Since the TFT 130A3 is in an OFF state, the voltage of the capacitor C2 remains V1 and the charge stored in the capacitor C2 remains Qb1. The voltages of the liquid crystal capacitor CLA2 and the storage capacitor CCSA2 of the sub pixel SA2 also become V2.

Next, when the gate signal voltage supplied to the gate line Gn is turned OFF and the gate signal voltage supplied to the gate line Gn+1 is turned ON (state 3 in FIG. 10), the TFTs 130A1 and 130A2 are put into an OFF state and the TFT 130A3 is put into an ON state. When the TFT 130A3 is put into the ON state, the charges are re-distributed such that the voltage of the capacitor C1 and the voltage of the capacitor C2 of the sub pixel SA1 are equal to each other. A sum of charges Q3+Qb2 stored in the capacitors C1 and C2 in state 3 is equal to a sum of charges Q2+Qb1 stored in the capacitors C1 and C2 in state 2 ($Q3+Qb2=Q2+Qb1$). By the normal driving of inverting the polarity of the applied voltage frame by frame, the polarity of the charge Q2 stored in the capacitor C2 is opposite to the polarity of the new inflow charge. Therefore, the overall charge amount is reduced, and the voltage is decreased. Voltage V3 of the capacitors C1 and C2 is:

$$V3=Q3/C1=Qb2/C2.$$

Where $C2/C1=\alpha$, $$V3=1/(1+\alpha)\times V2+\alpha/(1+\alpha)\times V1$$

Since this phenomenon does not occur in the sub pixel SA2, the voltage of the liquid crystal capacitor CLA2 of the sub pixel SA2 remains V2. As a result, there occurs a difference between voltage V2 of the liquid crystal capacitor CLA2 of the sub pixel SA2 and voltage V3 of the liquid crystal capacitor CLA1 of the sub pixel SA1. After the voltages of the capacitors C1 and C2 both become V3, the gate signal voltage supplied to the gate line Gn+1 is turned OFF. When the gate signal voltages supplied to the gate lines Gn and Gn+1 are both turned OFF (state 1 in FIG. 10) in this manner, namely, when the TFTs 130A1, 130A2 and 130A3 are all in an OFF state, the voltages of the capacitors C1 and C2 are approximately equal to each other. After this, the states are repeatedly changed from state 1 to state 2 to state 3 to state 1 every vertical scanning period.

In the above description, the gates of the TFTs 130A3 through 130D3 corresponding to the gate line G of the n'th row are electrically connected to the gate lines Gn+1 and Gn+2 respectively, but the present invention is not limited to this. It is sufficient that the gates of the TFTs 130A3 through 130D3 corresponding to the gate lines Gn are each electrically connected to an optional line which is turned ON before the next time the TFTs 130A1 through 130D1 and 130A2 through 130D2 are selected by the gate lines Gn after at least 1 vertical scanning period passes after the TFTs 130A1 through 130D1 and 130A2 through 130D2 are once selected.

In the above description, a line for selecting the third TFTs 130s3 of the color display pixels D of a certain row is electrically connected to the gate line G for selecting the first and second TFTs 130s1 and 130s2 of the color display pixels D of another row. The present invention is not limited to this. The line for selecting the third TFTs 130s3 does not absolutely need to be electrically connected to the gate line G. For example, a signal equivalent to the gate signal supplied to the gate line G may be individually supplied to the line for selecting the third TFTs 130s3.

In the above description, the pixels adjacent to each other in the row direction in one, same color display pixel D have different polarities from each other, but the present invention is not limited to this. The pixels adjacent to each other in the row direction in one, same color display pixel D may have the same polarity.

In the above description, the source signals supplied to the two source lines Ls provided between the columns of pixels adjacent to each other have polarities inverted to each other, but the present invention is not limited to this. The source signals supplied to the two source lines Ls provided between the columns of pixels adjacent to each other may have the same polarity.

In the above description, the red pixel R and the blue pixel B having a larger area size are arrayed in the column direction, but the present invention is not limited to this. The red pixel R and the blue pixel B may be arrayed in the row direction.

Figure 11:
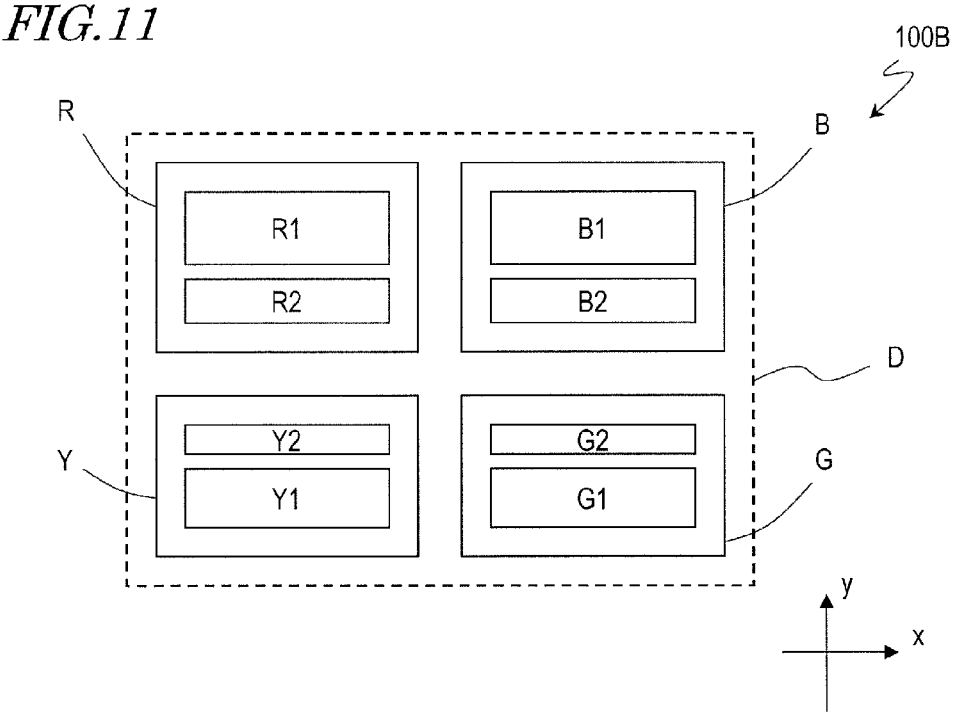
[FIG. 11]

FIG. 11 is a schematic view of the color display pixel D in a liquid crystal display device 100B. In the liquid crystal display device 100B, the red pixel R and the blue pixel B having a larger area size are arrayed in the row direction, the sub pixel B2 is adjacent to the sub pixel R2 in the row direction, and the sub pixel Y2 is adjacent to the sub pixel R2 in the column direction.

In the above description, the red pixel R and the blue pixel B each have an area size larger than the area size of each of the green pixel G and the yellow pixel Y, but the present invention is not limited to this.

Figure 12:
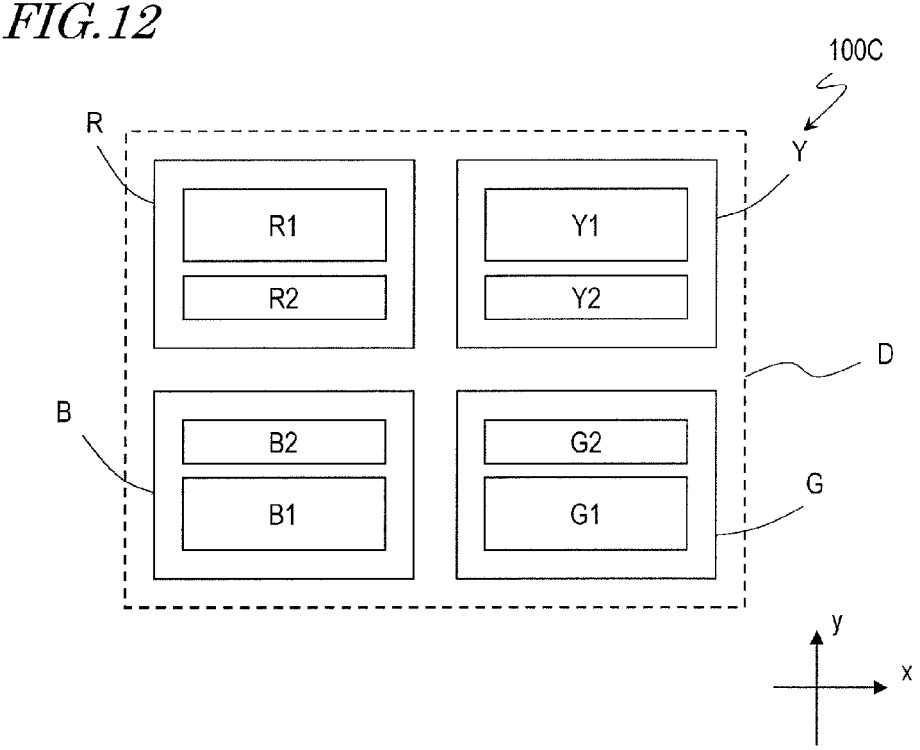
[FIG. 12]

FIG. 12 is a schematic view of the color display pixel D in a liquid crystal display device 100C. In the liquid crystal display device 100C, the red pixel R, the green pixel G, the blue pixel B and the yellow pixel Y have area sizes approximately equal to each other. For example, the lengths of the red pixel R, the green pixel G, the blue pixel B and the yellow pixel Y in the column direction are approximately equal to each other, and the lengths of the red pixel R, the green pixel G, the blue pixel B and the yellow pixel Y in the row direction are approximately equal to each other.

In the above description, in each pixel P, the sub pixel S1 has an area size larger than the area size of the sub pixel S2, but the present invention is not limited to this.

Figure 13:
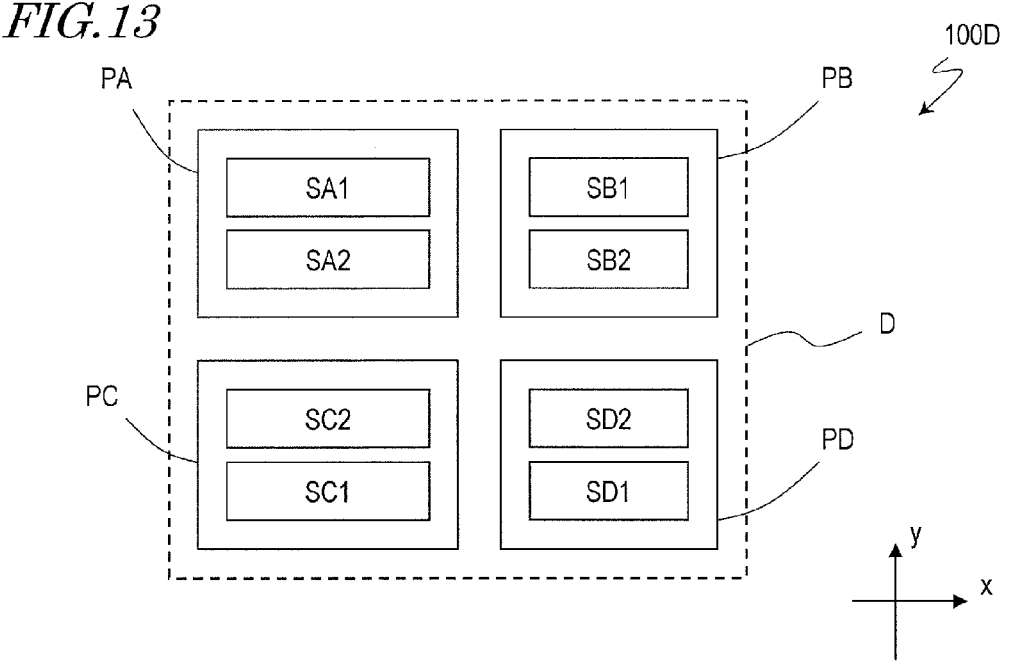
[FIG. 13]

FIG. 13 is a schematic view of the color display pixel D in a liquid crystal display device 100D. In the liquid crystal display device 100D, the sub pixels SA1 through SD1 each have an area size approximately equal to the area size of the corresponding sub pixel among the sub pixels SA2 through SD2. Specifically, in the pixel PA, the length of the sub pixel SA1 in the row direction is approximately equal to the length of the sub pixel SA2 in the row direction, and the length of the sub pixel SA1 in the column direction is approximately equal to the length of the sub pixel SA2 in the column direction. Similarly, in the pixels PB through PD, the length of each of the sub pixels SB1 through SD1 in the row direction is approximately equal to the length of the corresponding sub pixel among the sub pixels SB2 through SD2 in the row direction, and the length of each of the sub pixels SB1 through SD1 in the column direction is approximately equal to the length of the corresponding pixel among the sub pixels SB2 through SD2 in the column direction.

The sub pixels SA1 through SD1 may each have an area size smaller than the area size of the corresponding sub pixel among the sub pixels SA2 through SD2. Alternatively, the sub pixels SA1 through SD1 and SA2 through SD2 may all have an approximately equal area size.

In the above description, the red pixel is adjacent to the blue pixel in the row direction or in the column direction, is adjacent to the yellow pixel in the column direction or in the row direction, and is adjacent to the green pixel in an oblique direction. The present invention is not limited to this. The red, green, blue and yellow pixels may be arrayed in any order. for example, the red pixel R, the green pixel G, the blue pixel B, and the yellow pixel Y may be provided as a first pixel, a second pixel, a third pixel, and a fourth pixel, as shown in F*ig*.20.

In the above description, the red pixel and the blue pixel each have an area size equal to, or larger than, the area size of each of the green pixel and the yellow pixel. The present invention is not limited to this. The red pixel and the blue pixel may each have an area size smaller than the area size of each of the green pixel and the yellow pixel. Alternatively, the red pixel, the green pixel, the blue pixel and the yellow pixel may have area sizes having any relationship.

In the above description, the liquid crystal display device uses red, green, blue and yellow as the primary colors, but the present invention is not limited to this. The liquid crystal display device may use red, green, blue and cyan or magenta as the primary colors. Alternatively, the color display pixel D may include a white pixel in addition to the red pixel, the green pixel and the blue pixel. Still alternatively, the liquid crystal display device may have primary colors of any other combination.

In the above description, the color display pixel D includes a plurality of pixels for displaying different colors from each other, but the present invention is not limited to this. At least two pixels among the plurality of pixels included in the color display pixel D may display substantially the same colors. For example, the color display pixel D may include two red pixels, one green pixel and one blue pixel.

In the above description, the color display pixel D includes four pixels PA through PD, but the present invention is not limited to this. For example, the color display pixel D may include six sub pixels.

Figure 14:
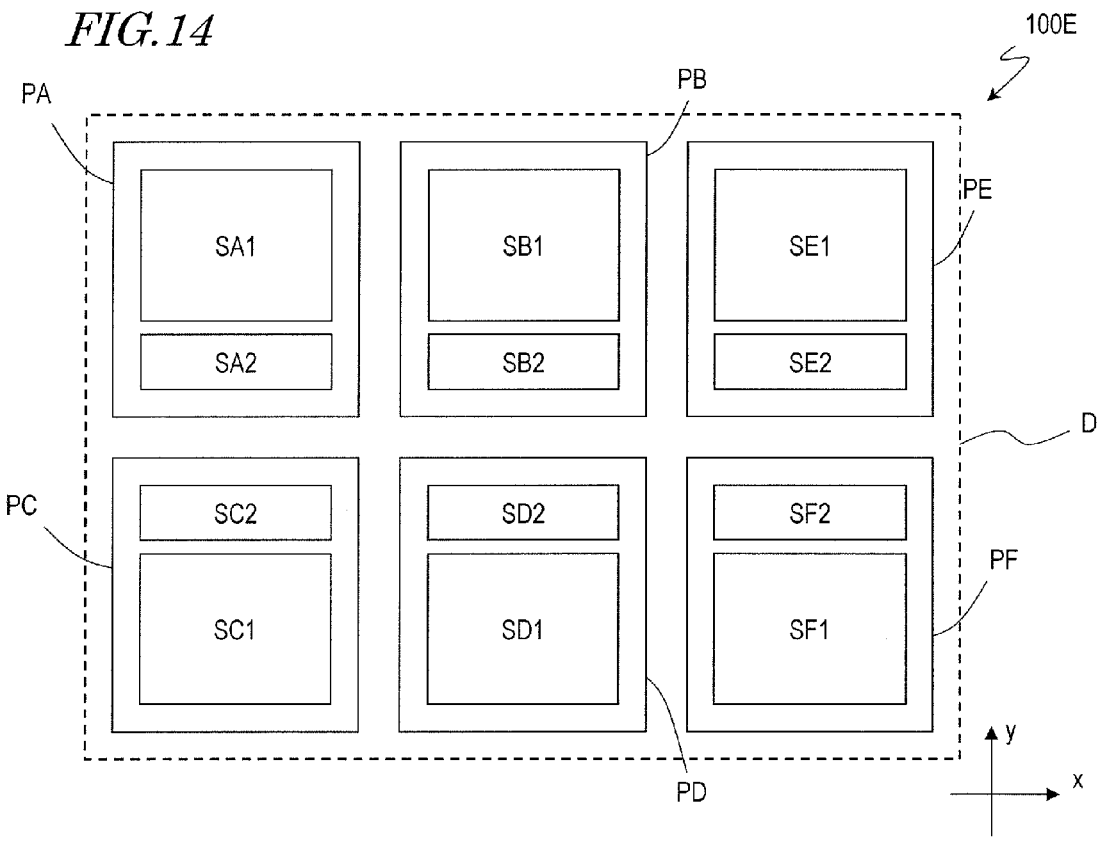
[FIG. 14]

FIG. 14 is a schematic view of the color display pixel D in a liquid crystal display device 100E. The liquid crystal display device 100E has substantially the same structure as that of the above-described liquid crystal display devices except that in the liquid crystal display device 100E, the color display pixel D includes pixels PE and PF in addition to the pixels PA through PD. In order to avoid redundancy, the same description will not be repeated.

In the liquid crystal display device 100E, the color display pixel D includes the pixels PE and PF in addition to the pixels PA through PD. The pixels PA through PD are arrayed in substantially the same manner as in the above-described liquid crystal display devices. The pixel PE is adjacent to the pixel PB in the row direction, and the pixels PA, PB and PE are arrayed linearly in the row direction. The pixel PF is adjacent to the pixel PD in the row direction, and the pixels PC, PD and PF are arrayed linearly in the row direction. Thus, the pixel PE is adjacent to the pixel PD in an oblique direction, and the pixel PF is adjacent to the pixel PB in an oblique direction. As can be seen, the pixels PA through PF included in the color display pixel D are arrayed in two rows by three columns. In this specification, the pixels PE and PF may be respectively referred to as the "fifth pixel PE" and "sixth pixel PF".

The pixel PE includes sub pixels SE1 and SE2, and the pixel PF includes sub pixels SF1 and SF2. In the liquid crystal display device 100E, the sub pixel SE2 is adjacent to the sub pixel SB2 in the row direction, and the sub pixel SF2 is adjacent to the sub pixel SD2 in the row direction. The sub pixel SE2 is adjacent to the sub pixel SD2 in an oblique direction, and the sub pixel SF2 is adjacent to the sub pixel SB2 in an oblique direction. Thus, the sub pixels SA2, SB2 and SE2 are arrayed linearly in the row direction, and the sub pixels SC2, SD2 and SF2 are arrayed linearly in the row direction. Thus, the sub pixels S included in the color display pixel D are arrayed in four rows by three columns.

In the liquid crystal display device 100E also, at least at a certain intermediate gray scale level, the luminance of the sub pixels SA2 through SF2 is higher than the luminance of the sub pixels SA1 through SF1. Since the sub pixels SA2 through SF2 exhibiting such a high luminance are provided close to each other in the color display pixel D, coloring can be suppressed. For example, the pixels PA through PF are of any combination of red, green, blue, yellow, cyan and magenta.

In the above description, the sub pixels S1 and S2 included in each pixel P are arrayed in the column direction (y direction), and the sub pixels included in one, same color display pixel D are arrayed in four rows. The present invention is not limited to this. The sub pixels S1 and S2 included in each pixel P may be arrayed in the row direction (x direction), and the sub pixels included in one, same color display pixel D may be arrayed in four columns.

Figure 15:
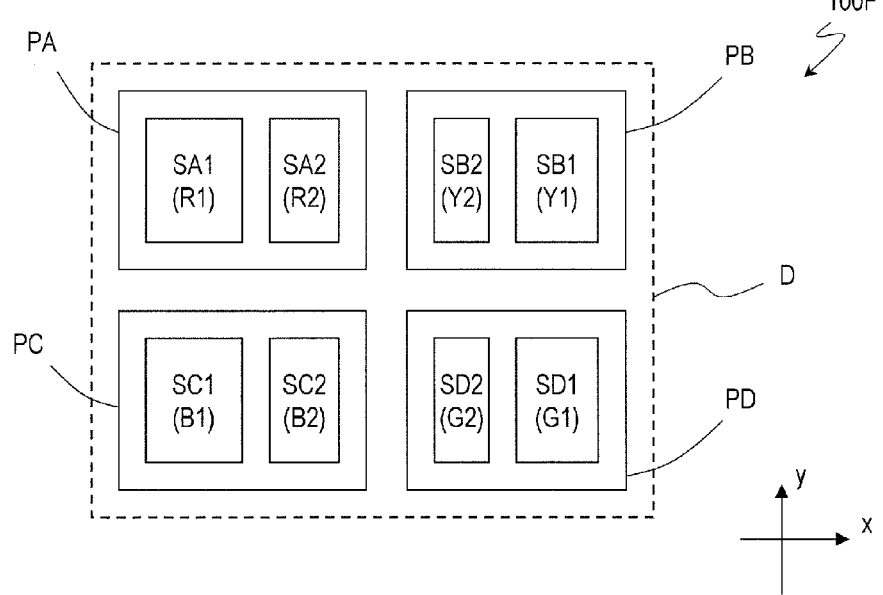
[FIG. 15]

FIG. 15 is a schematic view of the color display pixel D in a liquid crystal display device 100F. In the liquid crystal display device 100F, the color display pixel D includes the pixels PA through PD. The pixels PA through PD each include sub pixels S1 and S2. In each of the pixels PA through PD, the sub pixels S1 and S2 are arrayed in the row direction, and the sub pixel SA1 through SD1 and SA2 through SD2 are arrayed in two rows by four columns.

Regarding the sub pixel S2, the sub pixel SB2 is adjacent to the sub pixel SA2 in the row direction, and the sub pixel SC2 is adjacent to the sub pixel SA2 in the column direction. The pixel SD2 is adjacent to the sub pixel SB2 in the column direction and is adjacent to the sub pixel SC2 in the row direction. Thus, the sub pixel SD2 is adjacent to the sub pixel SA2 in an oblique direction. In the liquid crystal display device 100F, the sub pixels SA2 through SD2 are arrayed to be adjacent to each other at a center of the color display pixel D in the row direction, and therefore coloring is suppressed. Regarding the sub pixel S1, the sub pixel SC1 is adjacent to the sub pixel SA1 in the column direction, and the sub pixel SD1 is adjacent to the sub pixel SB1 in the column direction.

For example, the pixels PA through PD are respectively the red pixel R, the yellow pixel Y, the blue pixel B and the green pixel G. The red pixel R and the blue pixel B each an area size larger than the area size of each of the green pixel G and the yellow pixel Y. Specifically, the length of each of the red and blue pixels R and B in the column direction is approximately equal to the length of each of the yellow and green pixels G and Y in the column direction, but the length of each of the red and blue pixels R and B in the row direction is longer than the length of each of the yellow and green pixels G and Y in the row direction.

In the liquid crystal display device 100F shown in FIG. 15, the pixels PA and PC each have an area size larger than the area size of each of the pixels PB and PD. Alternatively, the pixels PA through PD may all have an approximately equal area size, or the pixels PA and PC may each have an area size smaller than the area size of each of the pixels PB and PD. In the liquid crystal display device 100F shown in FIG. 15, in each pixel P, the area size of the sub pixel S1 is larger than the area size of the sub pixel S2. Alternatively, the area size of the sub pixel S1 may be approximately equal to the area size of the sub pixel S2. Still alternatively, the area size of the sub pixel S1 may be smaller than the area size of the sub pixel S2. Still alternatively, the sub pixels SA1 through SD1 and SA2 through SD2 may have an approximately equal area size.

In the liquid crystal display device 100F described above with reference to FIG. 15, the color display pixel D includes four pixels PA through PD, but the present invention is not limited to this. For example, the color display pixel D may include six pixels.

Figure 16:
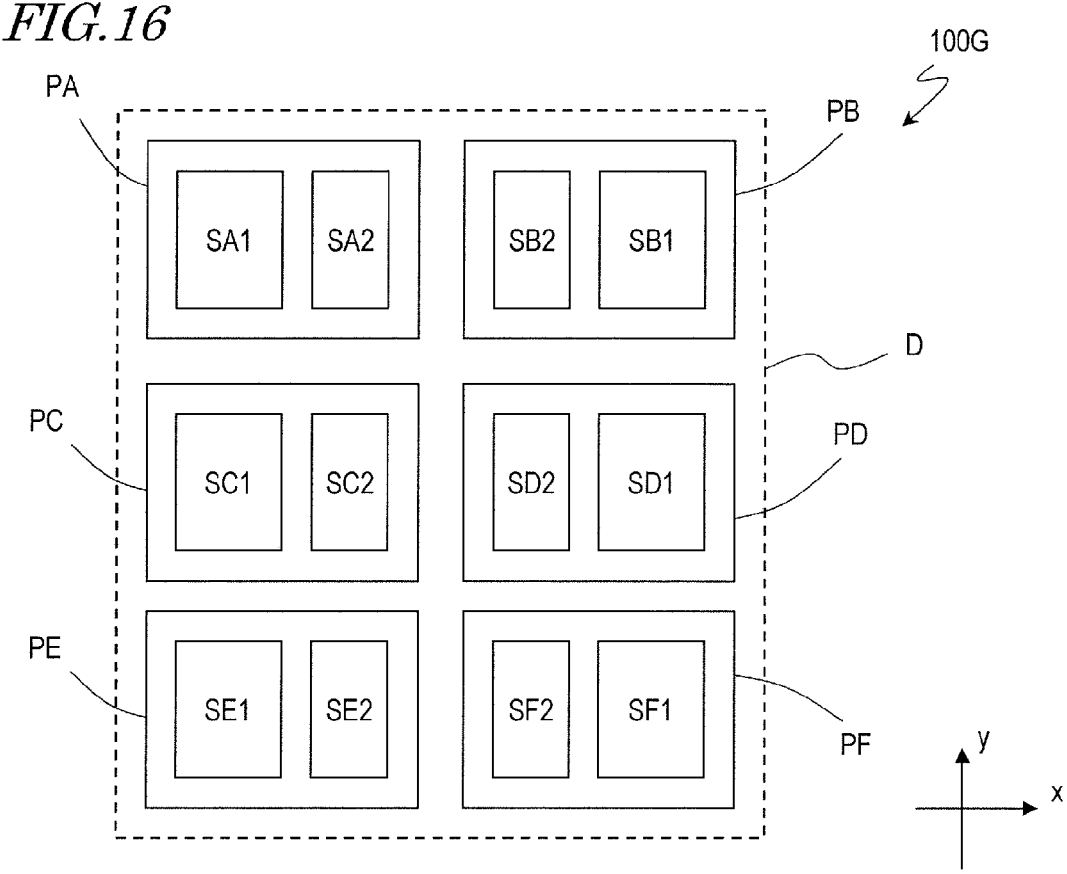
[FIG. 16]

FIG. 16 is a schematic view of the color display pixel D in a liquid crystal display device 100G. The liquid crystal display device 100G has substantially the same structure as that of the liquid crystal display device 100F except that in the liquid crystal display device 100G, the color display pixel D includes pixels PE and PF in addition to the pixels PA through PD. In order to avoid redundancy, the same description will not be repeated.

In the liquid crystal display device 100G, the color display pixel D includes the pixels PE and PF in addition to the pixels PA through PD. The pixels PA through PD are arrayed in substantially the same manner as in the liquid crystal display device 100F described above. The pixel PE is adjacent to the pixel PC in the column direction, and the pixels PA, PC and PE are arrayed linearly in the column direction. The pixel PF is adjacent to the pixel PD in the column direction, and the pixels PB, PD and PF are arrayed linearly in the column direction. Thus, the pixel PE is adjacent to the pixel PD in an oblique direction, and the pixel PF is adjacent to the pixel PC in an oblique direction. The pixels PA through PF are arrayed in three rows by two columns.

The pixel PE includes sub pixels SE1 and SE2, and the pixel PF includes sub pixels SF1 and SF2. The sub pixel SE2 is adjacent to the sub pixel SC2 in the column direction, and the sub pixel SF2 is adjacent to the sub pixel SD2 in the column direction. Thus, the sub pixels SA2, SC2 and SE2 are arrayed linearly in the column direction, and the sub pixels SB2, SD2 and SF2 are arrayed linearly in the column direction. The sub pixel SE2 is adjacent to the sub pixel SD2 in an oblique direction, and the sub pixel SF2 is adjacent to the sub pixel SC2 in an oblique direction. Thus, the sub pixels S included in the color display pixel D are arrayed in three rows by four columns. As can be seen, in the liquid crystal display device 100G, the sub pixels S in each pixel P are arrayed in the row direction, but the sub pixels SA2 through SF2 are arrayed linearly in the column direction in two adjacent rows.

In the liquid crystal display device 100G also, at least at a certain intermediate gray scale level, the luminance of the sub pixels SA2 through SF2 is higher than the luminance of the sub pixels SA1 through SF1. Since the sub pixels SA2 through SF2 exhibiting such a high luminance are provided close to each other in the color display pixel D, coloring can be suppressed.

In the above description, the sub pixels S1 and S2 are all rectangular, and the sub pixels S1 and S2 have an approximately equal length at least in one of the row direction and the column direction, but the present invention is not limited to this. The sub pixels S1 and S2 do not need to be rectangular, and the sub pixels S1 and S2 may have different lengths both in the row direction and the column direction.

Figure 17:
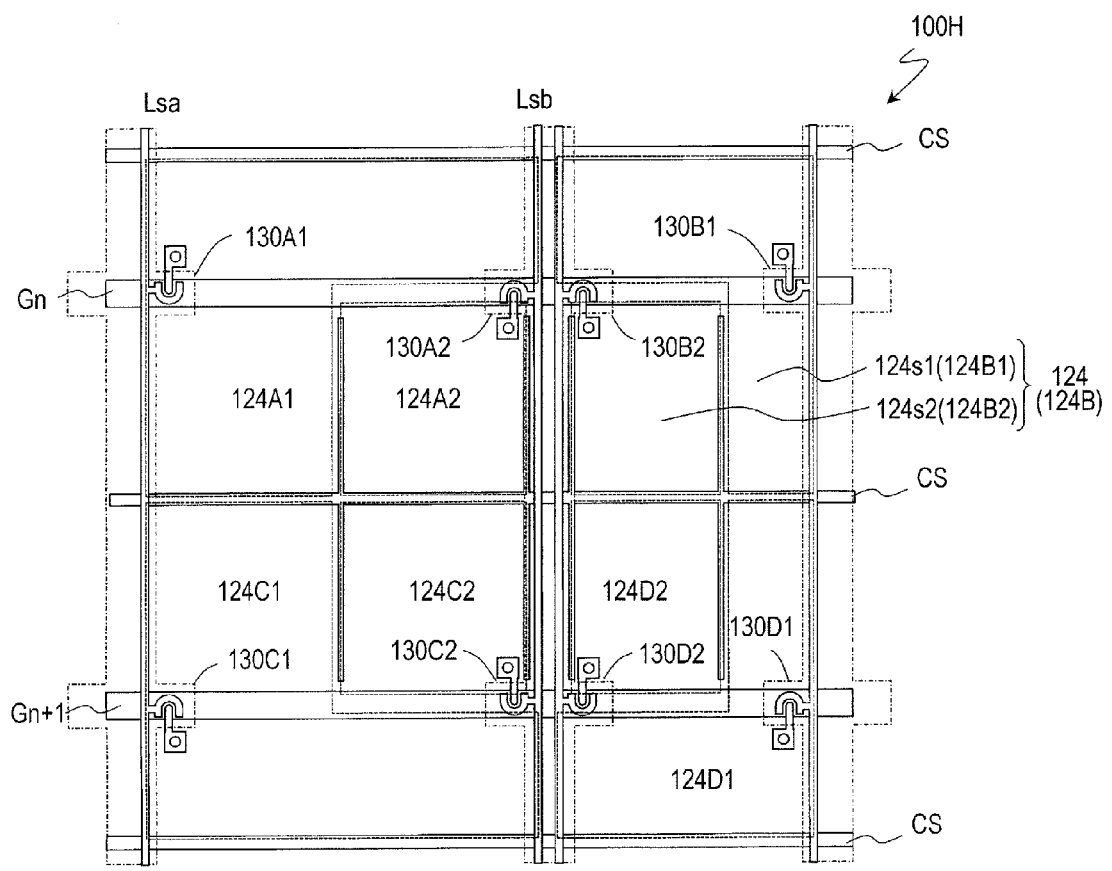
[FIG. 17]
Figure 18:
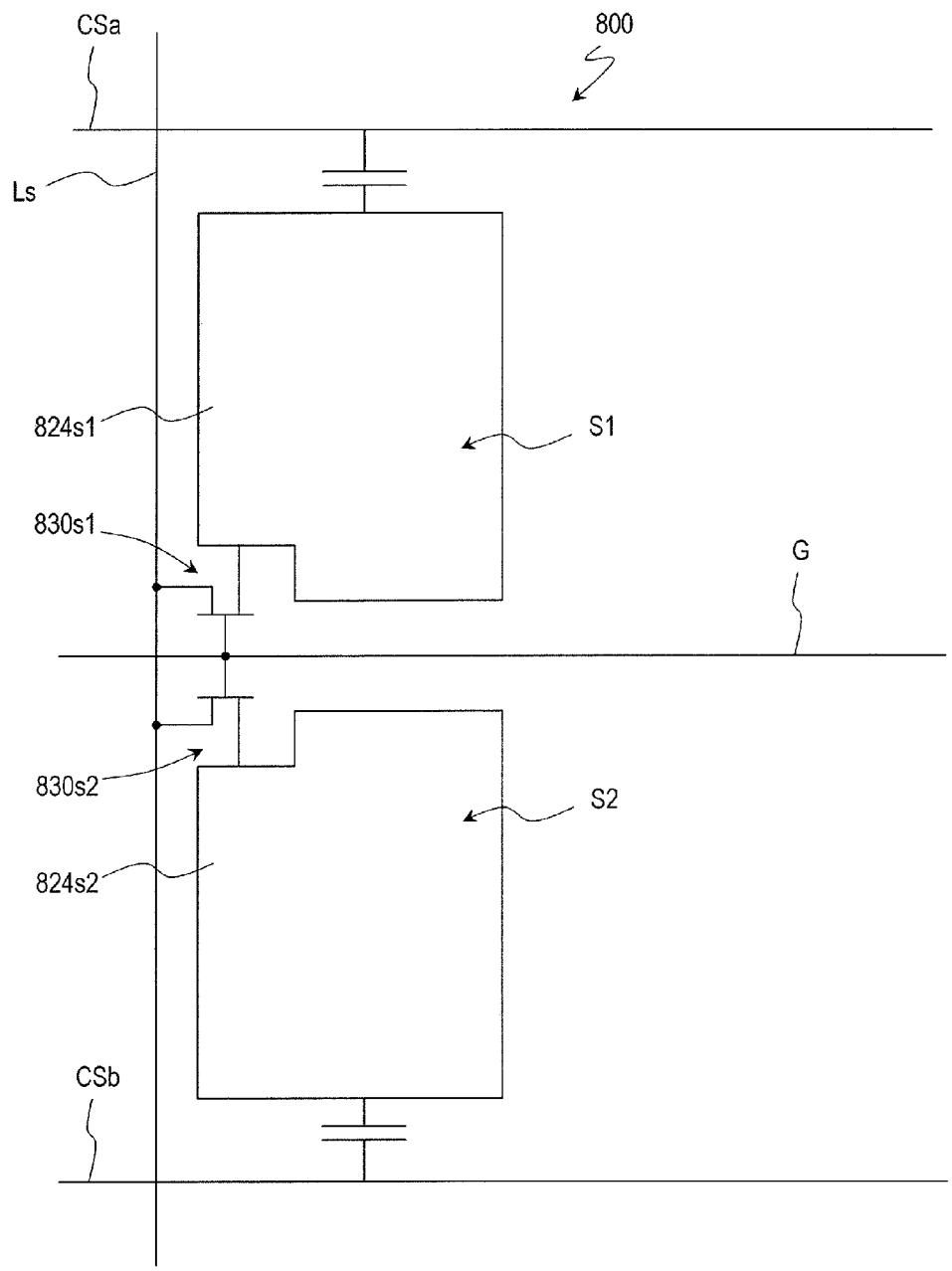
[FIG. 18]
Figure 19:
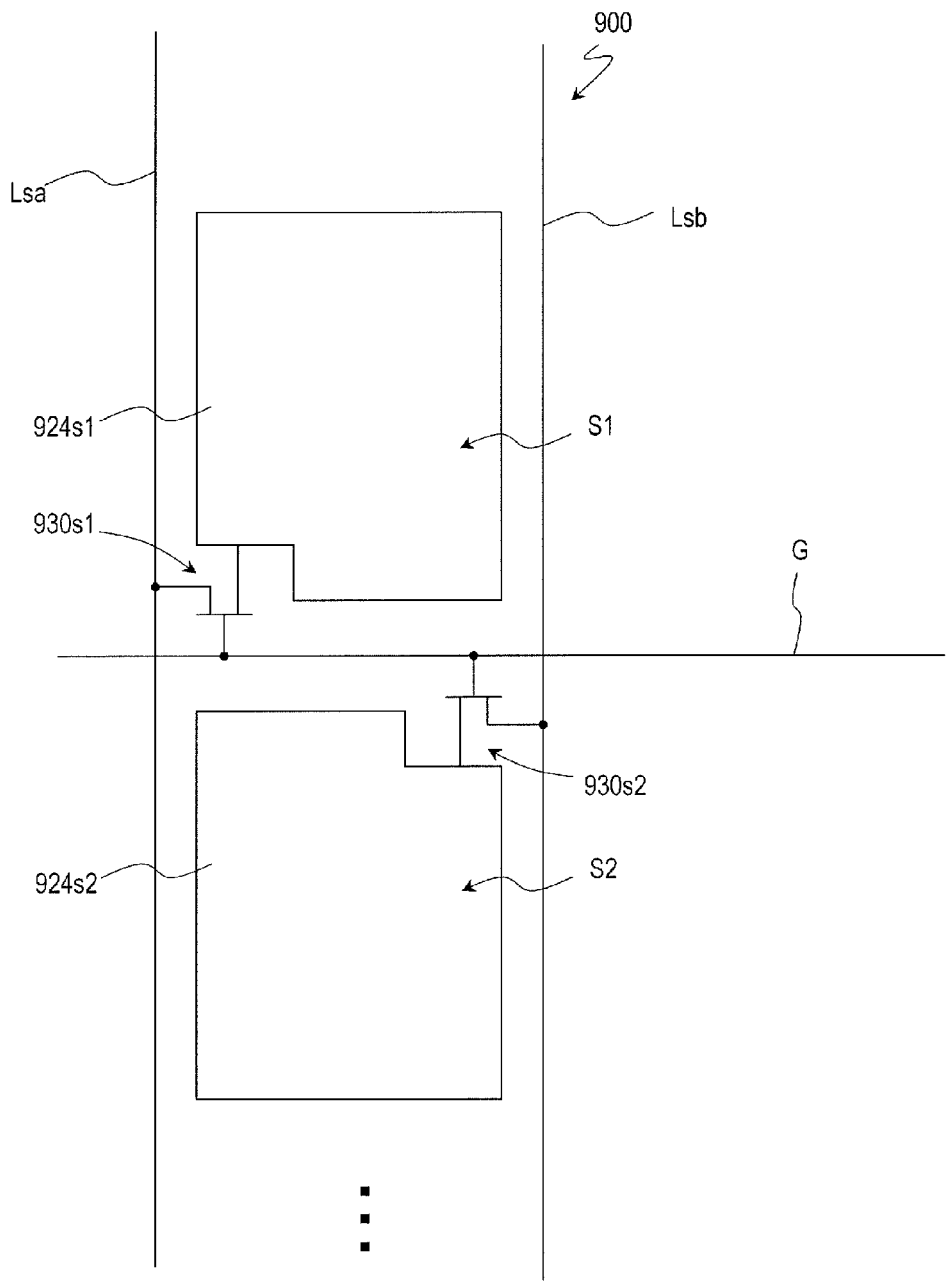
[FIG. 19]
Figure 20:
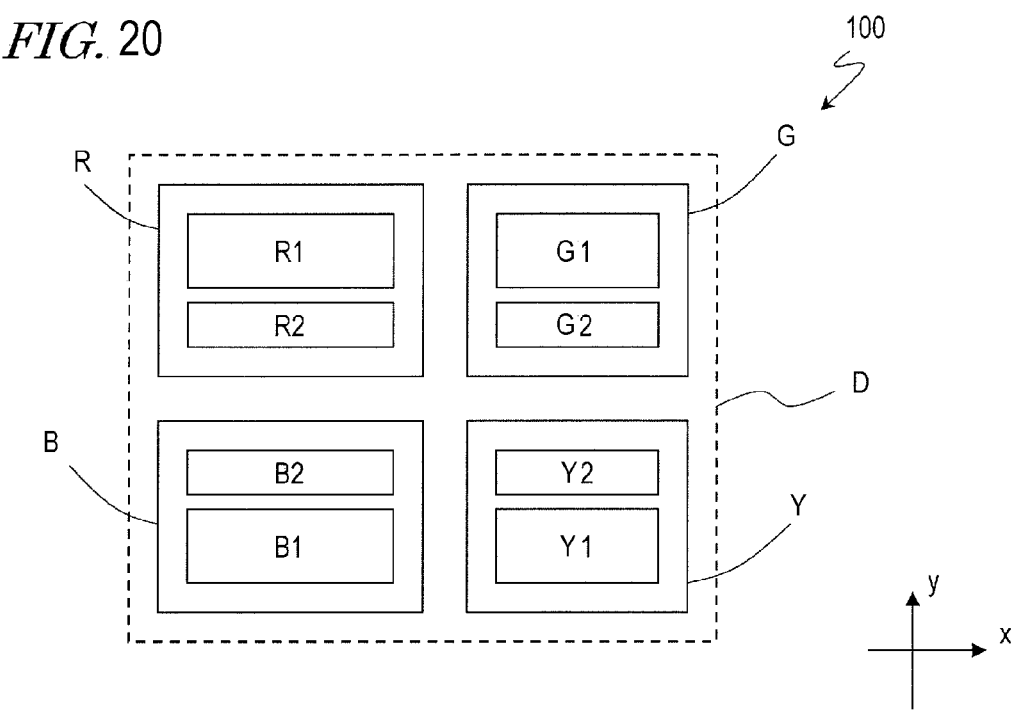
[FIG. 20]

FIG. 17 is a schematic view of the color display pixel D in a liquid crystal display device 100H. In the liquid crystal display device 100H, the sub pixel electrodes 124A2 through 124D2 are all rectangular. The sub pixel electrodes 124A2 through 124D2 are arrayed at a center of the color display pixel D, and the sub pixel electrodes 124A1 through 124D1 are provided to surround the sub pixel electrodes 124A2 through 124D2.

The greatest length of the sub pixel electrode 124$s$1 in the row direction is longer than the length of the sub pixel electrode 124$s$2 in the row direction, and the greatest length of the sub pixel electrode 124$s$1 in the column direction is longer than the length of the sub pixel electrode 124$s$2 in the column direction. The sub pixel electrode 124$s$2 electrode is rectangular, and four liquid crystal domains can be formed in the sub pixel S2 defined by the sub pixel electrode 124$s$2 in a simple manner. The sub pixel electrode 124$s$1 is not rectangular, but includes a plurality of rectangular unit areas (in this example, three rectangular areas). Thus, four liquid crystal domains can be formed for each of the unit areas in the sub pixel S1 defined by the sub pixel 124$s$1.

In the above description, each pixel P includes two sub pixels S, but the present invention is not limited to this. The pixel P may include three or more sub pixels S. In this case, it is sufficient that the sub pixel S exhibiting the highest luminance among the three or more sub pixels included in the pixel P is adjacent to the sub pixel S exhibiting the highest luminance in another pixel P.

In the above description, the color display pixels D arrayed in a matrix have the same pixel array as each other, but the present invention is not limited to this. The color display pixels D adjacent to each other in one of the row direction and the column direction may have the same pixel array. Alternatively, the color display pixels D adjacent to each other in the row direction and the column direction may have different pixel arrays.

INDUSTRIAL APPLICABILITY

According to the present invention, a liquid crystal display device can provide display with a good viewing angle characteristic without lowering the display quality.

Reference Signs List
- 100 Liquid crystal display device
- 120 Rear substrate
- 124 Pixel electrode
- 140 Front substrate
- 160 Liquid crystal layer

The invention claimed is:

1. A liquid crystal display device comprising a color display pixel which includes a plurality of pixels arrayed in a matrix of a plurality of rows by a plurality of columns, wherein:
   the plurality of pixels include:
      a first pixel;
      a second pixel adjacent to the first pixel in a row direction;
      a third pixel adjacent to the first pixel in a column direction; and
      a fourth pixel adjacent to the second pixel in the column direction and adjacent to the third pixel in the row direction;
   the plurality of pixels each include a plurality of sub pixels including a first sub pixel and a second sub pixel;
   at least at an intermediate gray scale level, in each of the plurality of pixels, the second sub pixel exhibits a luminance higher than the luminance of the first sub pixel;
   the plurality of sub pixels included in the plurality pixels are arrayed in a matrix of a plurality of rows by a plurality of columns;
   the second sub pixel in the first pixel is adjacent to the second sub pixel in the second pixel in the row direction, is adjacent to the second sub pixel in the third pixel in the column direction, and is adjacent to the second sub pixel in the fourth pixel in an oblique direction;
   the first sub pixel in the first pixel and the first sub pixel in the third pixel are adjacent to each other in the column direction; and
   the first sub pixel in the second pixel and the first sub pixel in the fourth pixel are adjacent to each other in the column direction.

2. The liquid crystal display device of claim 1, wherein the plurality of pixels further include:
   the fifth pixel adjacent to the third pixel in the column direction; and
   a sixth pixel adjacent to the fourth pixel in the column direction.

3. The liquid crystal display device of claim 1, wherein the plurality of pixels display different colors from each other.

4. The liquid crystal display device of claim 3, wherein the plurality of pixels include a red pixel, a green pixel, a blue pixel and a yellow pixel as the first, second, third and fourth pixels.

5. The liquid crystal display device of claim 4, wherein the red pixel and the blue pixel each have an area size larger than the area size of each of the green pixel and the yellow pixel.

6. The liquid crystal display device of claim 1, wherein in each of the plurality of pixels, the first sub pixel has an area sixe larger than the area size of the second sub pixel.

* * * * *